US009325264B2

(12) United States Patent
Iwaji et al.

(10) Patent No.: US 9,325,264 B2
(45) Date of Patent: Apr. 26, 2016

(54) ELECTRIC MOTOR DRIVE DEVICE

(75) Inventors: Yoshitaka Iwaji, Tokyo (JP); Ryoichi Takahata, Tokyo (JP); Takahiro Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 14/391,578

(22) PCT Filed: Apr. 12, 2012

(86) PCT No.: PCT/JP2012/060039
§ 371 (c)(1),
(2), (4) Date: Dec. 23, 2014

(87) PCT Pub. No.: WO2013/153656
PCT Pub. Date: Oct. 17, 2013

(65) Prior Publication Data
US 2015/0155805 A1  Jun. 4, 2015

(51) Int. Cl.
*H02P 6/18* (2006.01)
*H02P 21/14* (2006.01)

(52) U.S. Cl.
CPC .............. *H02P 6/187* (2013.01); *H02P 21/146* (2013.01)

(58) Field of Classification Search
CPC .............................. H02P 6/187; H02P 21/146
USPC ........................................................ 318/400.3
See application file for complete search history.

(56) References Cited

U.S. PATENT DOCUMENTS

| 6,396,229 B1 | 5/2002 | Sakamoto et al. |
| 2005/0269982 A1 | 12/2005 | Coles et al. |
| 2006/0197480 A1 | 9/2006 | Mori et al. |
| 2009/0115355 A1* | 5/2009 | Oyobe .................. H02M 7/493 318/34 |
| 2009/0174350 A1* | 7/2009 | Kuroda ..................... H02P 6/20 318/400.11 |

(Continued)

FOREIGN PATENT DOCUMENTS

| JP | 62-64289 A | 3/1987 |
| JP | 9-93979 A | 4/1997 |

(Continued)

OTHER PUBLICATIONS

International Search Report dated Jul. 10, 2012 with English translation (five (5) pages).

(Continued)

*Primary Examiner* — Jeffrey Donels
(74) *Attorney, Agent, or Firm* — Crowell & Moring LLP

(57) ABSTRACT

An electric motor drive device 1000 includes: an inverter 3 that drives a motor 4, a voltage division circuit 2 that serves as a neutral point potential detection unit that detects a neutral point potential of a stator winding of the motor 4; and a controller 1 that estimates a rotor position of the motor 4 based on the detected neutral point potential, and that controls the inverter 3 based on an estimation result. A ground potential of the controller 1 is set to a negative side potential or a positive side potential of a DC voltage that is supplied to the inverter 3. The voltage division circuit 2 detects the neutral point potential with reference to the negative side potential or the positive side potential. The controller 1 estimates the rotor position based on a difference between a first neutral point potential detected during the ON/OFF operation of the inverter 3 and a first fixed reference potential ($\tfrac{2}{3}$)Emax, and based on a difference between a second neutral point potential detected during the ON/OFF operation and a second fixed reference potential ($\tfrac{1}{3}$)Emax.

15 Claims, 28 Drawing Sheets

(56) References Cited

U.S. PATENT DOCUMENTS

| | | | | |
|---|---|---|---|---|
| 2010/0066284 A1* | 3/2010 | Iwaji | ...................... | H02P 6/187 318/400.02 |
| 2013/0057193 A1* | 3/2013 | Iwaji | ...................... | H02P 6/185 318/721 |
| 2013/0243625 A1* | 9/2013 | Iwaji | ...................... | H02P 6/002 417/410.1 |
| 2014/0152218 A1* | 6/2014 | Niederer | ................ | H02P 6/187 318/400.34 |

FOREIGN PATENT DOCUMENTS

| | | | |
|---|---|---|---|
| JP | 2001-251889 A | 9/2001 | |
| JP | 2005-537774 A | 12/2005 | |
| JP | 2006-230120 A | 8/2006 | |
| JP | 2010-74898 A | 4/2010 | |
| WO | WO 2004/023639 A1 | 3/2004 | |

OTHER PUBLICATIONS

International Search Report dated Jul. 17, 2012 with English translation of copending PCT International Application No. PCT/JP2012/060040 (U.S. Appl. No. 14/391,625) (three (3) pages).

Co-pending U.S. Appl. No. 14/391,625, filed Oct. 9, 2014.

* cited by examiner (a) INVERTER OUTPUT VOLTAGE (b) $\theta d$ AND VOLTAGE VECTORS

ELECTRIC MOTOR DRIVE DEVICE

TECHNICAL FIELD

The present invention relates to an electric motor drive device that drives and controls a synchronous motor that is used to control the rotational speed of, for example, a fan, a pump, a compressor, a spindle motor or the like, or to control a torque in a position determination device for a conveyor or a machine tool, an electric assistance system or the like; and also relates to an integrated type electric motor system, to a pump system, to a compressor system, and to a position determination system, all of which incorporate such an electric motor drive device.

BACKGROUND ART

Permanent magnet electric motors (i.e. synchronous motors) are compact and have high efficiency, and such motors are widely used in various fields, such as industry, consumer electronics, automobiles, and so on. However, for driving a permanent magnet motor, information about the position of the rotor of the motor is necessary, and due to this a position sensor has been required.

In recent years, it has become widely practiced to eliminate this position sensor, and it has become common to utilize sensor-less control for rotational speed control or torque control of a permanent magnet motor. By implementing sensor-less control, it is possible to economize upon the costs associated with the position sensor (i.e. to eliminate the cost of the sensor itself, the cost entailed by the wiring for the sensor, and so on), and to make the entire system more compact. Moreover, there are the merits that, by making the sensor unnecessary, it becomes possible to use the system in a poor quality environment, and so on. In current practice, for sensor-less control of a permanent magnet motor, either a method is employed of performing driving of the permanent magnet motor by directly detecting an induced voltage (i.e. a voltage due to speed) generated due to rotation of the rotor of the permanent magnet motor and by taking this as positional information for the rotor, or a technique of position estimation is employed by calculating an estimate of the rotor position from a numerical model of the subject motor, or the like.

However, there are also serious problems with these methods of sensor-less control. These occur with the position detection methods during low speed operation. The majority of methods of sensor-less control that are currently implemented in practice are ones based upon induced voltage generated by the permanent magnet motor. Accordingly, when the motor is stopped or in the low speed region in which the induced voltage is small, the sensitivity decreases undesirably, and there is a possibility that the position information may become buried in noise. Various strategies for solving this problem have been proposed.

With the invention described in Patent Document #1, position information is obtained by detecting the "neutral point potential", i.e. the potential at the connection point of the stator windings for the three phases. By detecting this neutral point potential in synchrony with the pulse voltages supplied from the inverter to the motor, it is possible to detect voltage induced due to imbalance of the inductances, and it is possible to obtain the potential change depending upon the rotor position. Due to this, the above invention is distinguished by position information being obtained during normal sine wave modulation of the voltages supplied to the motor by PWM (pulse width modulation). Here, the rotor position means the position of the permanent magnet that is installed to the rotor.

FIG. 27 is a figure showing an example of a conventional synchronous electric motor drive system, in which sensor-less motor driving is performed by detecting the neutral point potential of a permanent magnet motor. A controller 1K generates PWM signals for controlling a permanent magnet motor 4 on the basis of the value of neutral point potential that is detected. The PWM signals are inputted to an inverter 3, and the inverter 3 drives the permanent magnet motor 4 on the basis of the PWM signals.

A virtual neutral point circuit 100 is connected in parallel with the permanent magnet motor 4. In order to detect the neutral point potential of the permanent magnet motor 4, a virtual neutral point potential Vnn is extracted from the virtual neutral point circuit 100. A voltage division circuit 2 is provided in order to observe the neutral point potential Vn of the permanent magnet motor 4 while taking the virtual neutral point potential Vnn as a reference. The voltage-divided potential Vin generated by this voltage division circuit 2 is inputted to an A/D converter of the controller 1K via an insulating amplifier 101.

FIG. 28($a$) is a figure showing the output waveforms for the various phases as observed from the ground line (Ni) of the inverter 3. During normal PWM operation, the output potentials for the three phases change sequentially in this manner. And, at this time, the neutral point potential Vn and the virtual neutral point potential Vnn of the permanent magnet motor 4 change as shown in FIG. 28($b$). Since the impedances Z3 of the virtual neutral point circuit 100 are equal to one another, accordingly, depending upon the switched state, Vnn can assume one of the four values VDC, (⅔) VDC, (⅓) VDC, and 0. Here, VDC is the DC voltage value of the DC power supply 31 to the inverter.

On the other hand, fundamentally, Vn also changes in a similar manner to Vnn, since the impedances of the three windings for the three phases are equal. However, some influence is experienced from the magnetic flux of the magnets of the permanent magnet motor 4, and accordingly these inductance values for the three phases change slightly. As a result, the inductance values for the three phases are unbalanced and depend upon which phase (positional angle) the rotor is in, so that the value of Vn varies. The difference between this Vn and Vnn itself constitutes information about the position of the rotor, so that it is thereby possible to implement positioning without any sensor. Accordingly, it is necessary to input the difference between the signals Vn and Vnn to the controller 1K. In order to implement this, the neutral point potential Vn is observed while taking the virtual neutral point Vnn as a reference.

CITATION LIST

Patent Literature

Patent Document #1: Japanese Laid-Open Patent Publication No. 2010-74898

SUMMARY OF INVENTION

Technical Problem

However, since the reference potential varies greatly upward and downward according to the switched state of the inverter 3, accordingly it is essential that, as described above, this potential should be inputted to the controller such as a microcomputer or the like via an insulating amplifier. Normally, the voltage level of an input to an A/D converter of a controller such as a microcomputer or the like is around a few volts, and also it is necessary to ensure that at least the ground of the control circuit is constant. Due to this, for the use of this method for a motor that employs a comparatively high voltage such as 100V or greater, it becomes essential to employ an insulating amplifier.

An insulating amplifier is a component that is comparatively high in price, and this causes an increase in the cost. Moreover, since the interval for detection of the neutral point potential is an interval of extremely short pulse form, a high responsiveness is demanded from the insulating amplifier itself. However, it is not possible to obtain an insulating amplifier having high performance at a low price, so that it is difficult to develop the method described above, just as it is without any modification, for application to a consumer electrical product such as a washing machine or a refrigerator or the like, or for application to some typical industrial use.

Solution to Problem

An electric motor drive device according to a first aspect of the present invention, comprises: an inverter that causes a plurality of switching elements to perform ON/OFF operation, and that converts DC electrical power from a DC power supply into AC electrical power so as to drive a three-phase synchronous electric motor; a neutral point potential detection unit that detects a neutral point potential of a stator winding of the three-phase synchronous electric motor; and a control unit that estimates a rotor position of the three-phase synchronous electric motor based on the detected neutral point potential, and that controls the inverter based on an estimation result; wherein: a ground potential of the control unit is set to a negative side potential or a positive side potential of a DC voltage that is supplied to the inverter; the neutral point potential detection unit detects the neutral point potential with reference to the negative side potential or the positive side potential; and the control unit estimates the rotor position based on a difference between a first neutral point potential detected by the neutral point potential detection unit during the ON/OFF operation and a first fixed reference potential, and based on a difference between a second neutral point potential detected by the neutral point potential detection unit during the ON/OFF operation and a second fixed reference potential.

According to a second aspect of the present invention, in the electric motor drive device according to the first aspect, it is preferable that the control unit comprises: a first differential amplifier that generates a difference signal for the difference between the first neutral point potential and the first reference potential, and that amplifies and outputs this difference signal; a second differential amplifier that generates a difference signal for the difference between the second neutral point potential and the second reference potential, and that amplifies and outputs this difference signal; a first A/D converter that A/D converts an output signal of the first differential amplifier; and a second A/D converter that A/D converts an output signal of the second differential amplifier; and the rotor position is estimated based on outputs of the first and second A/D converters.

According to a third aspect of the present invention, in the electric motor drive device according to the first aspect, it is preferable that the control unit comprises: a selection unit that selects one of the first reference potential and the second reference potential in conjunction with the ON/OFF operation of the plurality of switching elements; a differential amplifier, to which the first and second neutral point potentials detected by the neutral point potential detection unit are inputted in order as a first input signal and a reference potential selected by the selection unit is inputted in order as a second input signal, and that amplifies and outputs a difference between the first input signal and the second input signal; and an A/D converter that A/D converts an output signal of the differential amplifier; and the rotor position is estimated based on an output of the A/D converter.

According to a fourth aspect of the present invention, in the electric motor drive device according to the second or third aspect, it is preferable that the control unit comprises a reference potential generation unit that generates the first and second reference potentials.

According to a fifth aspect of the present invention, in the electric motor drive device according to the fourth aspect, it is preferable to further comprise: a DC voltage division circuit that generates a voltage-divided potential by dividing a voltage of the DC power supply; wherein the reference potential generation unit generates the first and second reference potentials based on the voltage-divided potential.

According to a sixth aspect of the present invention, in the electric motor drive device according to the fourth aspect, it is preferable to further comprise: a DC voltage division circuit that generates a voltage-divided potential by dividing a voltage of the DC power supply; wherein based on the voltage-divided potential, the control unit corrects the difference signal that has been A/D converted so as to reduce influence of power supply voltage vibration upon the difference signal, and estimates the rotor position based on the corrected difference signal.

According to a seventh aspect of the present invention, in the electric motor drive device according to the second or third aspect, it is preferable to further comprise: a DC voltage divider circuit that generates first and second voltage-divided potentials as the first and second reference potentials by dividing a voltage of the DC power supply.

According to an eighth aspect of the present invention, in the electric motor drive device according to any one of the first to seventh aspects, it is preferable that an insulating amplifier is provided between the differential amplifier and the A/D converter; and the signal outputted from the differential amplifier is inputted to the A/D converter via the insulating amplifier.

According to a ninth aspect of the present invention, in the electric motor drive device according to any one of the first to eighth aspects, it is preferable that the control unit comprises an offset correction unit that, before starting of the three-phase synchronous electric motor, corrects an offset component included in the neutral point potential.

According to a tenth aspect of the present invention, in the electric motor drive device according to the ninth aspect, it is preferable that the offset correction unit sets the rotor to a plurality of rotational positions in order and detects corresponding neutral point potentials, and corrects the offset component based on a plurality of detected neutral point potentials.

According to an eleventh aspect of the present invention, in the electric motor drive device according to the ninth aspect, it is preferable that the offset correction unit comprises a voltage command output unit that outputs a plurality of voltage commands in order, and corrects the offset component based on the neutral point potential detected by the neutral point potential detection unit when each voltage command is outputted.

An integrated type electric motor system according to a twelfth aspect of the present invention comprises, housed within a common casing, an electric motor drive device according to any one of the first to eleventh aspects, and a rotor and a stator of a three-phase synchronous electric motor that is driven and controlled by the electric motor drive device.

A pump system according to a thirteenth aspect of the present invention comprises: an electric motor drive device according to any one of the first to eleventh aspects; a three-phase synchronous electric motor that is driven and controlled by the electric motor drive device; and a pump for liquid, that is driven by the three-phase synchronous electric motor.

A compressor system according to a fourteenth aspect of the present invention comprises: an electric motor drive device according to any one of the first to eleventh aspects; a three-phase synchronous electric motor that is driven and controlled by the electric motor drive device; and a compressor that is driven by the three-phase synchronous electric motor.

A position determination system according to a fifteenth aspect of the present invention comprises: an electric motor drive device according to any one of the first to eleventh aspects; a three-phase synchronous electric motor that is driven and controlled by the electric motor drive device; and a position determination stage that is slidingly driven or rotationally driven by forward rotation and reverse rotation of the three-phase synchronous electric motor.

Advantageous Effects of Invention

According to the present invention, it is possible to perform detection of the neutral point potential of a three-phase synchronous electric motor at high accuracy without using any insulating amplifier, and it is possible to implement sensorless driving with sine wave form electrical currents, from the ultra low speed region in the neighborhood of zero speed.

BRIEF DESCRIPTION OF DRAWINGS

FIG. 9 is a figure showing an example of an analog amplifier 5a;

DESCRIPTION OF EMBODIMENTS

In the following, embodiments of the present invention will be explained with reference to the figures. It should be understood that an electric motor drive device according to the present invention may be applied to rotational speed control of a fan, a pump (a hydraulic pump or a water pump), a compressor, a washing machine, a spindle motor, a disk drive or the like, to a position determination device for a conveyor or a machine tool, or to an application that controls torque, such as an electrical power assistance system or the like.

First Embodiment

Figure 1:
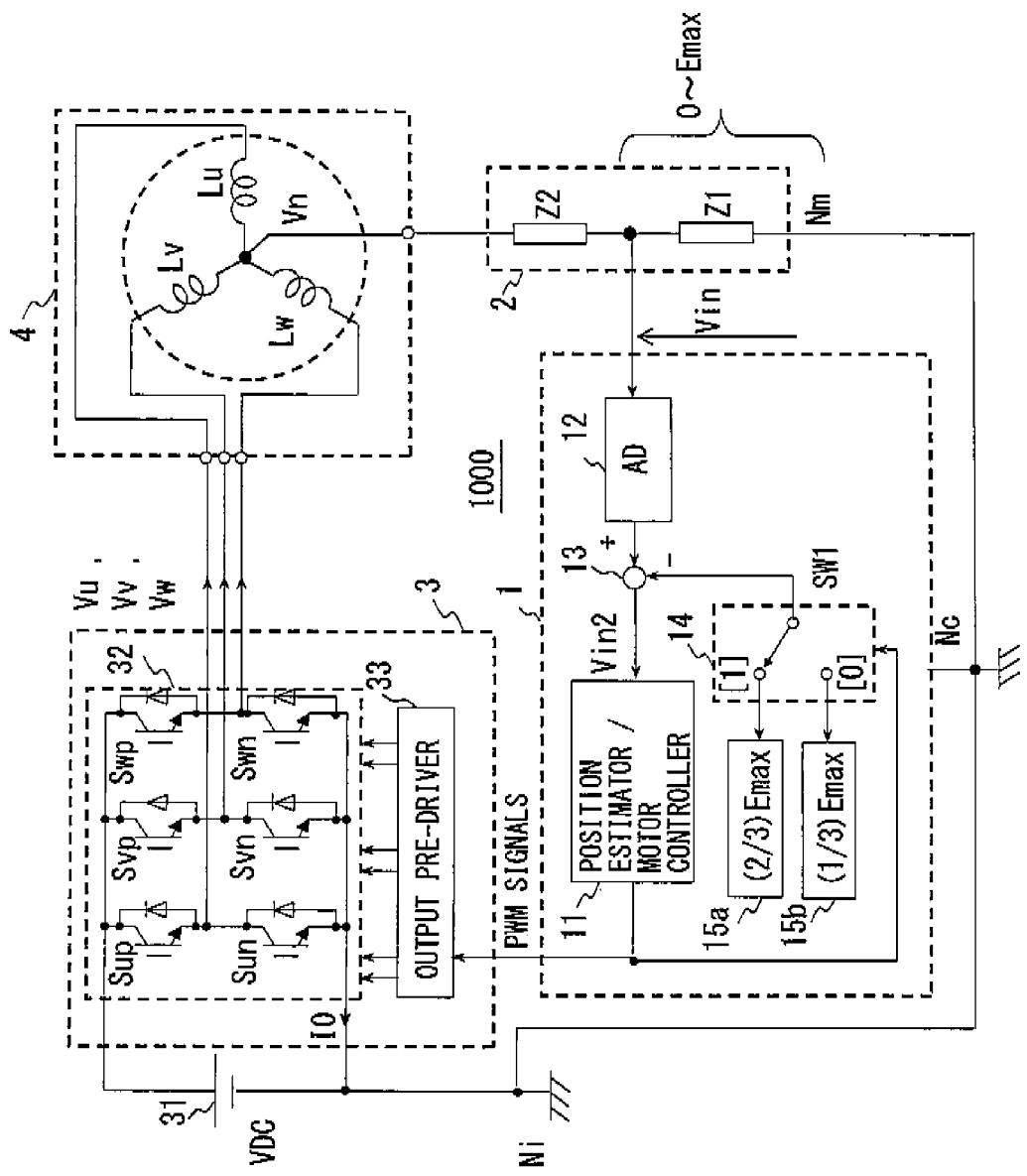
FIG. 1 is a block diagram showing the structure of an electric motor drive device according to a first embodiment of the present invention.

FIG. 1 is a block diagram showing the structure of an electric motor drive device according to a first embodiment of the present invention. This electric motor drive device is a device intended for driving a permanent magnet motor 4 (this being a three-phase synchronous electric motor). An electric motor drive device 1000 of this embodiment (and the same is true for the other embodiments) comprises a controller 1, a voltage division circuit 2, and a main inverter circuit 32 and an output pre-driver 33 that are provided at an inverter 3. It should be understood that it would be acceptable to consider the electric motor drive device as including a DC power supply 31. Moreover, it would also be acceptable to consider the DC power supply 31 as being included in the inverter 3.

The DC power supply 31 is a power supply that supplies DC power to the main inverter circuit 32. The main inverter circuit 32 is an inverter circuit that comprises six switching elements Sup through Swn. MOSFETs or IGBTs or the like are used for these switching elements Sup through Swn. The output pre-driver 33 is a driver that directly drives the main inverter circuit 32.

Vin is the voltage divided value of the neutral point potential of the permanent magnet motor 4 (hereinafter termed the "motor"), and this Vin is inputted to the controller 1. The controller 1 calculates an estimate of the position of the rotor of the motor 4 by performing signal processing upon this signal Vin in the interior of the controller 1, and generates PWM signals for controlling the permanent magnet motor 4 to a desired speed or to a desired torque. This calculation of an estimate of the rotor position and generation of PWM signals is performed by a position estimator/motor controller 11. Apart from this position estimator/motor controller 11, the controller 1 also comprises an A/D converter 12, a subtractor 13, a signal changeover device 14, and reference voltage generators 15a and 15b.

The inverter 3 amplifies the PWM signals from the controller 1 with the output pre-driver 33, and drives the switching elements Sup through Swn of the main inverter circuit 32. The outputs of the inverter 3 are supplied to the three-phase stator windings (stator coils) of the motor 4, and the motor 4 is driven thereby. The neutral point potential Vn of the stator winding of the motor 4 is lowered by the voltage division circuit 2 to the value Vin of the input level of the controller 1. This neutral point potential Vin is inputted to the controller 1. In this connection, the input range of the controller 1 is supposed to be 0 to Emax. It should be understood that, in this embodiment, the ground Nm of the voltage division circuit 2, the ground Nc of the controller 1, and the ground Ni of the inverter 3 are all mutually connected together.

The neutral point potential Vin inputted to the controller 1 is discretized by the A/D converter 12 provided internally to the controller 1. The reference voltage generator 15a provided internally to the controller 1 generates a reference voltage of ($2/3$) Emax, while the reference voltage generator 15b generates a reference voltage of ($1/3$) Emax. These reference voltages ($2/3$) Emax and ($1/3$) Emax are inputted to the subtractor 13 via the signal changeover device 14, and are subtracted by the subtractor 13 from the output of the A/D converter 12. The result of this subtraction, i.e. Vin2, is inputted to the position estimator/motor controller 11. And, according to the switching state of the PWM signals that are the output of the position estimator/motor controller 11, the signal changeover device 14 performs changeover.

(Sensor-Less Control Employing the Neutral Point Potential)

Figure 2:
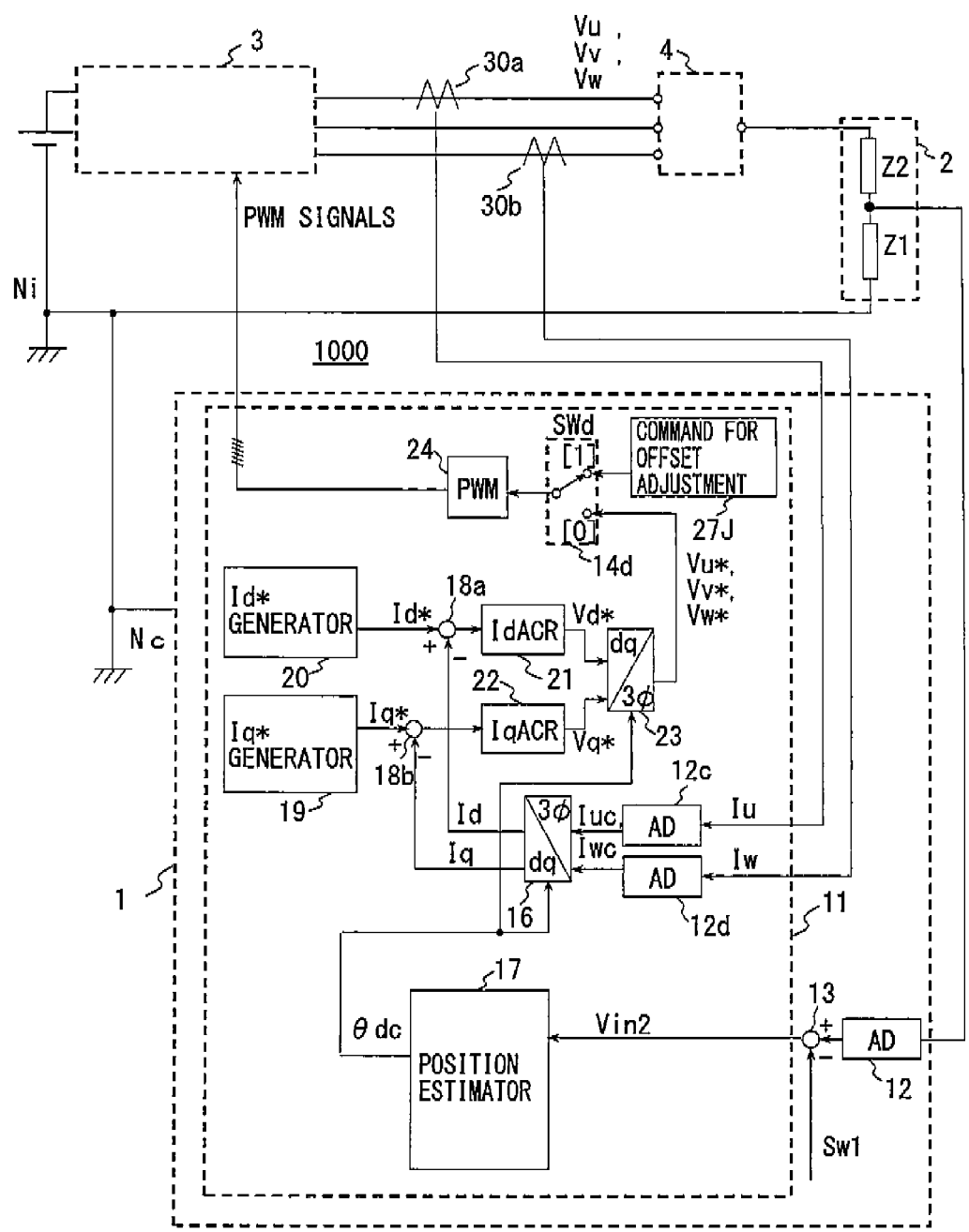
FIG. 2 is a block diagram showing the details of a position estimator/motor controller 11 shown in FIG. 1.

FIG. 2 is a block diagram showing the details of the position estimator/motor controller 11 shown in FIG. 1, and shows the main portion of a sensor-less control block that employs the neutral point potential. Although this feature is omitted from FIG. 1, it should be understood that phase current sensors 30a and 30b are provided for detecting the motor currents. While, in the example shown in FIG. 2, the motor currents are detected by the phase current sensors 30a and 30b, it would also be acceptable to arrange to detect the DC bus line current (i.e. the current in the DC power supply line) within the inverter 3.

The values detected by the phase current sensors 30a and 30b are inputted to A/D converters 12c and 12d provided in the position estimator/motor controller 11. These A/D converters 12c and 12d discretize the detected values of the phase currents Iu and Iw of the motor 4, and input them into the interior of the controller. The discretized values Iuc and Iwc of the phase currents Iu and Iw are converted by a coordinate converter 16 into values Id and Iq in d-q coordinates, these being rotation coordinate axes.

This d-q coordinate conversion is a per se conventional type of conversion that is used in vector control of an AC motor, in which the direction of the permanent magnet magnetic flux is the d axis, while the torque current direction that is orthogonal to this d axis is the q axis. The phase angle θdc used in this coordinate conversion is provided by a position estimator 17. This position estimator 17 is a device that calculates an estimate of the rotor phase on the basis of the amount of variation of the neutral point potential. It should be understood that this calculation of an estimate of the rotor phase may be performed by employing a technique such as that described in Patent Document #1, or the like.

The differences between the command values Id* and Iq* for the current values Id and Iq, and the actual current values Id and Iq, are calculated by subtractors 18a and 18b. And current controllers 21 and 22 calculate voltage commands Vd* and Vq* for performing control, so that these differences calculated by the subtractors 18a and 18b, in other words the deviations of the actual current values Id and Iq from their command values Id* and Iq*, should become zero. The voltage commands Vd* and Vq* outputted from the current controllers 21 and 22 are converted into values in three-phase alternating current by a d-q inverse converter 23, and then are converted into pulse width modulated signals by a PWM generator 24.

It should be understood that Id* and Iq*, i.e. the command values for Id and Iq, are respectively outputted by an Id* generator 20 and by an Iq* generator 19. While the Id* generator 20 normally gives "zero" if the motor is of the non-salient-pole type, in the case of a motor having saliency, it is controlled to a minus value that depends upon the load. Moreover, while the Iq* generator 19 is a device that indirectly generates a torque command, and in FIG. 2 it is described as being included in the position estimator/motor controller 11, it could also be provided by a higher ranking control unit, such as a speed controller or a position controller or the like.

Next, a summary will be explained of a sensor-less positioning algorithm that employs the neutral point potential of a permanent magnet motor. In all, eight voltages (i.e. switching patterns) can be outputted by the inverter 3. For example, if the state of the arm for each phase of the main inverter circuit 32 is represented as "1" when the upper side switching element is ON and the lower side switching element is OFF and is represented as "0" when the upper side switching element is OFF and the lower side switching element is ON, then expressions in which all the phases are written together as a vector become as shown in FIG. 3(a).

Figure 3:
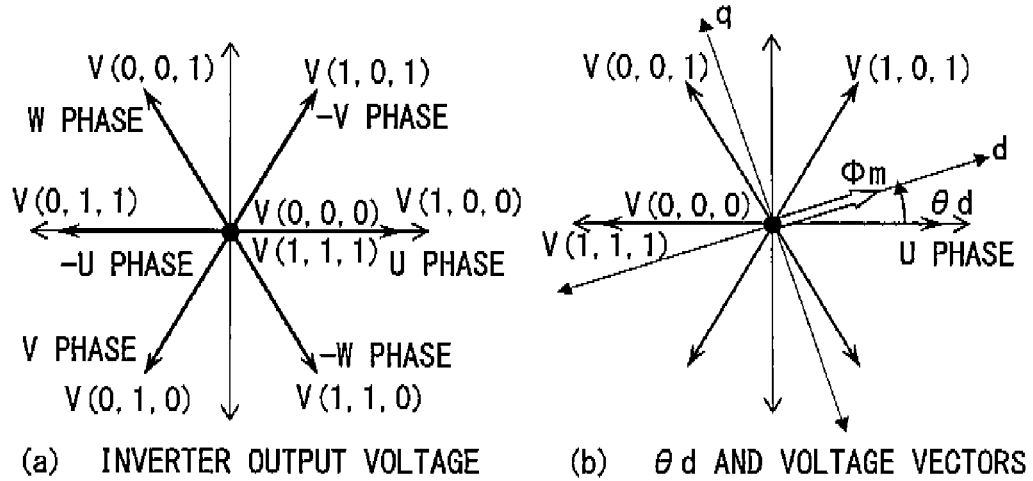
FIG. 3 is a figure for explanation of a voltage vector.

V(1,0,0) and so on in FIG. 3(a) indicate the switched states of the switching elements of the inverter 3: V(1,0,0) means that, for the U, V, and W phases in order, the upper element is ON, the lower element is ON, and the lower element is ON. Including the two zero vectors V(0,0,0) and V(1,1,1), a total of eight voltage patterns can be outputted by the inverter 3. This type of vector expression is obtained by converting the switched states into α-β coordinates. The relationship between these vector expressions and the coordinate axes of the permanent magnet motor 4 are shown in FIG. 3(b). The d-q coordinates rotate anticlockwise since, by contrast to the output voltage vectors, which are on a fixed coordinate system, the d-q coordinates are rotating coordinates.

Figure 4:
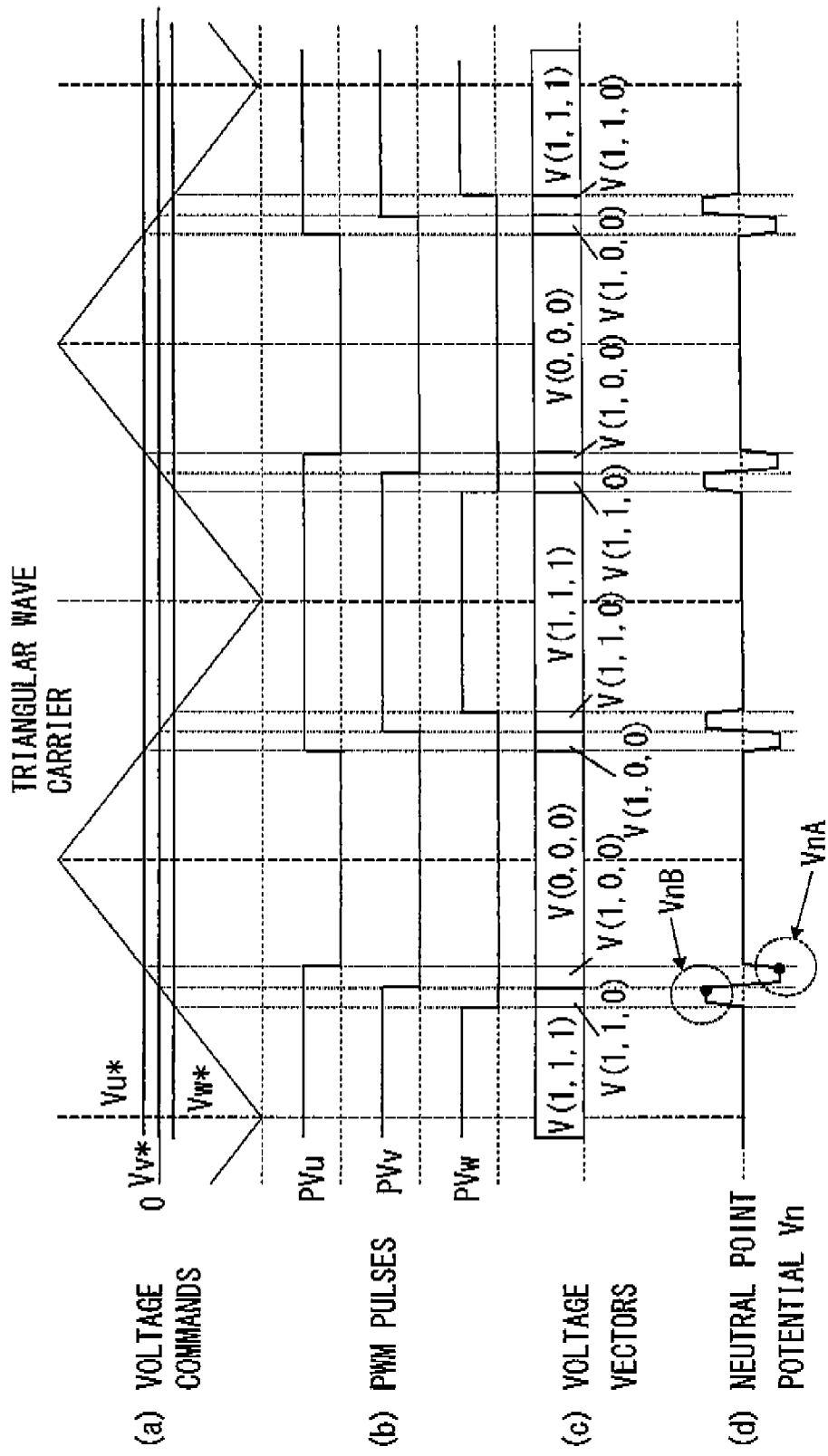
FIG. 4 is a figure showing the relationship between this voltage vector and a PWM waveform actually outputted by an inverter 3.

FIG. 4 is a figure showing the relationship between these vectors (also termed "voltage vectors") and the PWM waveforms actually outputted by the inverter 3. FIG. 4(a) is a figure showing the relationship between the three-phase voltage commands (the outputs of the d-q inverse converter 23) and a triangular wave carrier. And FIG. 4(b) shows the PWM pulses PVu, PVv, and PVw that are outputted. Moreover, FIG. 4(c) shows the voltage vectors that are generated. And FIG. 4(d) is a figure showing the varying potential that is generated at the neutral point of the motor 4 when these voltage vectors are applied. It should be understood that in FIG. 4, the waveforms at some instant are schematically depicted, and the three phase voltage commands Vu*, Vv*, and Vw* are DC amounts. While really these are AC amounts that change in the form of sine waves, they may be considered as being DC in this manner if the frequencies of their fundamental waves are low and the carrier frequency is sufficiently high.

As shown in FIG. 4(c), the voltage vectors outputted by the inverter 3 are vectors of four types, including two zero vectors. And, as shown in FIG. 4(d), variations in the neutral point potential that correspond to the rotor position are observed in the intervals in which the vectors V(1,0,0) and V(1,1,0) that are not zero are outputted. This is considered to be a phenomenon due to an influence being experienced from the magnetic flux of the permanent magnets of the rotor, and, since differences are present between the inductances of the various phase windings, the neutral point potential Vn0 varies because of these differences in the inductances. It should be understood that, here, the amount of variation of the neutral point potential that is generated when V(1,0,0) is applied is termed VnA, while the amount of variation of the neutral point potential that is generated when V(1,1,0) is applied is termed VnB.

Figure 5:
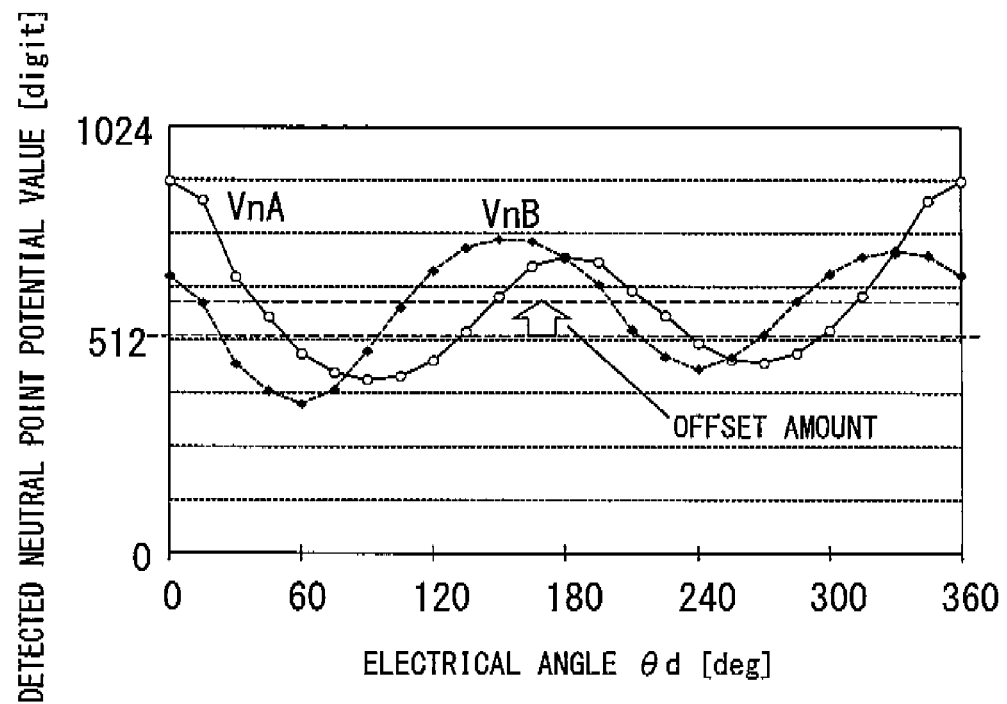
FIG. 5 is a figure showing change of neutral point potential.

FIG. 5 is a figure showing actually measured values of the variations VnA and VnB according to the rotor phase θd. FIG. 5 shows a case in which the detection circuit is designed so that its input range is 10 bits (1024) and its center value is 512. It will be understood that it is possible to confirm the dependence upon the electrical angle and to perform position estimation. The position estimator 17 described above calculates an estimate of the rotor phase on the basis of these amounts of variation of the neutral point potential.

For example, the estimated value θdc of the rotor phase may be obtained by calculation as described below. Here, the neutral point potentials VnA and VnB that exhibit changes as in FIG. 5 are viewed as being two among three phase AC amounts Xu, Xv, and Xw, as in the following Equation (1), and it is considered that VnC (=Xw) represents the neutral point potential of the remaining one phase. Here, Xw (VnC) can be derived from the relationship Xu+Xv+Xw=0.

$$Xu=VnA, Xv=-VnB, Xw=VnC \quad (1)$$

Next, Xa and Xb are derived by performing three-phase to two-phase conversion (i.e. α-β conversion) upon these three-phase AC amounts Xu, Xv, and Xw, according to the following Equation (2). Using the results, the estimated value θdc of the rotor position θd may be obtained according to the following Equation (3). It should be understood that, in Equation (3), "arctan" means the arc-tangent function.

$$Xa=(2/3) \cdot \{Xu-(1/2) \cdot Xv-(1/2) \cdot Xw\}$$

$$Xb=(2/3) \cdot \{(\sqrt{3}/2) \cdot Xv-(\sqrt{3}/2) \cdot Xw\} \quad (2)$$

$$\theta dc=(1/2)\arctan(Xb/Xa) \quad (3)$$

Next, the method for producing the neutral point potential Vin will be explained. As described above, the motor is PWM controlled by the inverter 3, and examples of the waveforms are shown in FIG. 6(a). When the three-phase output terminals of the inverter 3 are observed from the ground level Ni of the inverter 3, the waveforms that are seen assume either the value zero or the value VDC (the DC voltage value of the inverter 3). VDC is the voltage value at the input side of the inverter 3. If the neutral point potential Vn of the motor 4 is observed from the ground level Ni, in other words if the potential Ni is taken as a reference, this potential changes between 0 and VDC.

A voltage division ratio (Z1/(Z1+Z2)) is set by the voltage division circuit 2 so that a change of the neutral point potential Vn (0 to VDC) falls within the range between 0 to Emax. It is preferable for the range of the neutral point potential (0 to Emax) and the input range of the A/D converter 12 substantially to agree with one another. As a result, the waveform of the neutral point potential Vin becomes as shown in FIG. 6(b). While, fundamentally, the neutral point potential Vin ought to assume the values 0, (1/3) Emax, (2/3) Emax, and Emax at four points, actually, as described above, certain amounts of deviation are observed corresponding to the position (i.e. the phase) of the rotor, due to the influence of magnetic flux in the interior of the permanent magnet motor 4.

The neutral point potential Vin is discretized by the A/D converter 12, and the reference voltage (2/3) Emax or (1/3) Emax is subtracted therefrom by the subtractor 13. Which among these two reference voltages (2/3) Emax or (1/3) Emax is selected, is determined by the PWM signals.

The signal SW1 of FIG. 6(c) is the switching signal that is inputted from the controller 1 to the signal changeover device 14. When this switching signal SW1 is 1, the switch of the signal changeover device 14 is changed over to its "1" side, while, when the switching signal SW1 is 0, the switch of the signal changeover device 14 is changed over to its "0" side. If, among the three phases outputted by the inverter 3, two or more of the outputs are equal to VDC, then the switch of the signal changeover device 14 is set to its "1" side, and the reference voltage (2/3) Emax from the reference voltage generator 15a is selected. In any other case, in other words if the number of phases that are equal to VDC is one or less, then the switch is set to its "0" side, and the reference voltage (1/3) Emax from the reference voltage generator 15b is selected.

As a result, as shown in FIG. 6(d), the amount of variation Vin2 of the neutral point potential Vin of the motor 4 from the potential (2/3) Emax or the potential (1/3) Emax can be extracted. This amount of variation Vin2 of the neutral point potential Vin is equivalent to the output of the insulating amplifier 101 shown in FIG. 27, and it thereby becomes possible to implement estimation of the rotor position and motor control on the basis of the neutral point potential.

Figure 26:
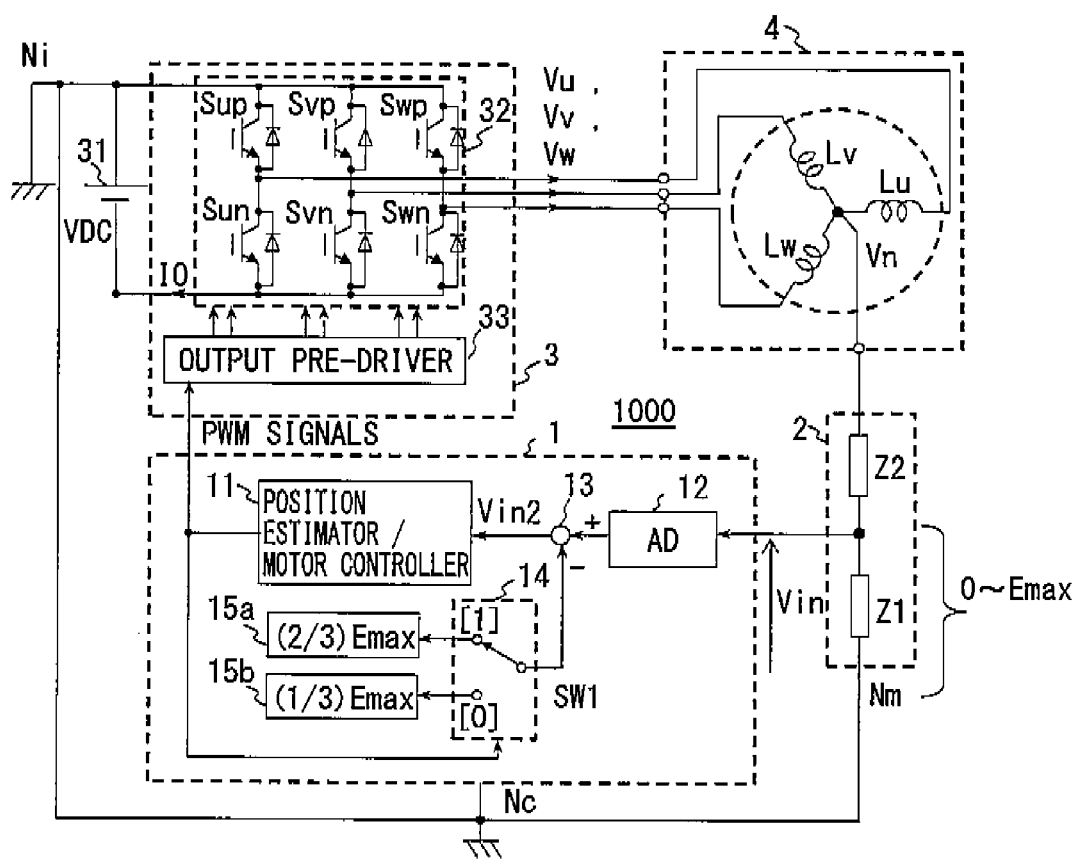
FIG. 26 is a figure showing a structure in which the positive side of a DC voltage (the positive side of a DC power supply 31) is taken as a ground Ni.

It should be understood that while, with the structure shown in FIG. 1, the negative side of the DC voltage supplied to the inverter 3 (i.e. the negative side of the DC power supply 31) is taken as being the ground Ni of the inverter 3, alternatively, as shown in FIG. 26, it would also be acceptable to take the positive side of the DC voltage (i.e. the positive side of the DC power supply 31) as being this ground Ni.

As has been explained above, in this embodiment, the voltage division circuit 2 that serves as a neutral point potential detection unit that detects the neutral point potential is incorporated, the ground potential of the controller 1 is set to the potential of the negative side or of the positive side of the DC voltage that is supplied to the inverter 3, and it is arranged to detect the neutral point potential by taking this ground potential as a reference. And the fixed first reference potential and the fixed second reference potential that do not experience any influence due to the ON/OFF operation of the inverter 3 are generated within the controller 1 as shown in FIG. 1, and it is arranged to estimate the rotor position on the basis of the difference between the first neutral point potential and the fixed first reference potential, and on the basis of the difference between the second neutral point potential and the fixed second reference potential. Due to this, the standard potentials (i.e. the reference potentials) do not greatly vary upward and downward according to the switched state of the inverter, as was the case with a conventional device in which the neutral point potential was observed by taking a virtual neutral point as a reference.

As a result, it is possible to input the neutral point potential that has been detected to the controller 1 such as a microcomputer or the like without interposing any insulating amplifier. Furthermore, since it is possible to manage without employing any insulating amplifier, which would suffer from a certain instability from the point of view of responsiveness, accordingly it is possible to perform detection of the neutral point potential of a three-phase synchronous electric motor at high accuracy, and it is possible to implement sensor-less driving in a convenient manner with currents having sine waveforms, from the ultra-low speed region in the neighborhood of zero speed.

Second Embodiment

Figure 7:
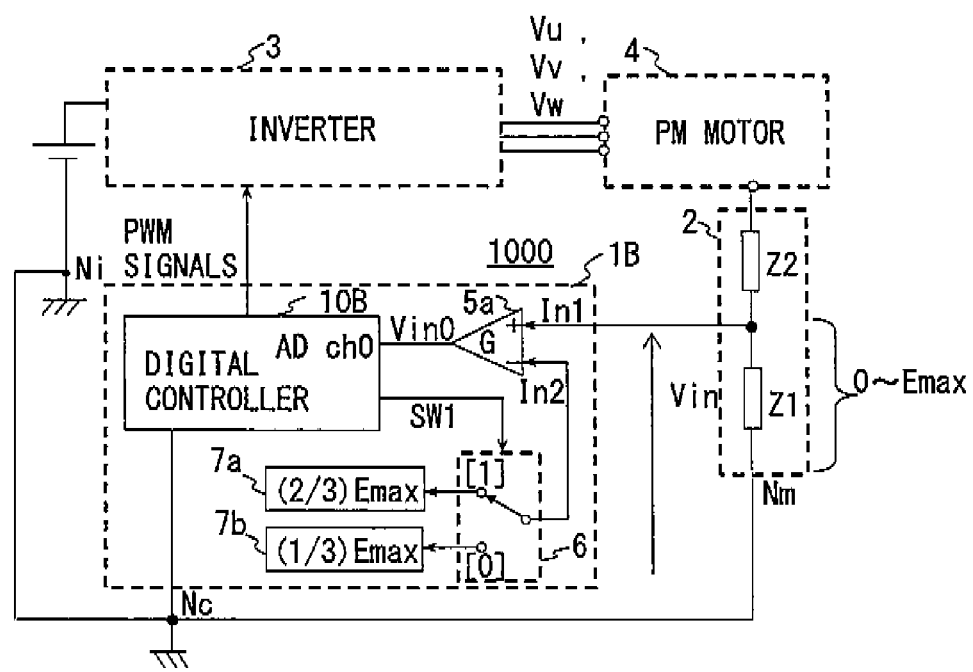
FIG. 7 is a block diagram showing the structure of an electric motor drive device according to a second embodiment of the present invention.

FIG. 7 is a block diagram showing the structure of an electric motor drive device according to a second embodiment of the present invention. This electric motor drive device has many components in common with the electric motor drive device according to the first embodiment shown in FIG. 1. In concrete terms, the voltage division circuit 2 and the inverter 3 have the same structure as those shown in FIG. 1, while the structure of the controller 1B is different from that of the controller 1. It should be understood that description of the internal structural components of the inverter 3 and of the motor 4 is omitted.

In the first embodiment described above, it is arranged for the neutral point potential Vin obtained by the voltage division circuit 2 to be inputted just as it is without alteration to the A/D converter 12 within the controller 1, and for the difference between its value after discretization and a reference voltage to be obtained. In this case of this type of structure, if the resolving power of the A/D converter 12 is not sufficiently high, then it is not possible to ensure the required detection accuracy, due to the following reasons.

The amount by which the neutral point potential varies depends upon the position of the rotor, and is only a few percent of the voltage VDC of the power supply to the inverter 3. For example, with an A/D converter of around ten bits, it is only possible to obtain information about changes having width of only 10 digit. While the accuracy is enhanced if the resolving power of the A/D converter 12 is increased, the downside is that this causes an increase in the cost. Moreover, if a high speed A/D converter of high resolving power is employed, then there is the problem that the amount of electrical power consumed by the A/D converter 12 itself increases undesirably. Accordingly, in this embodiment, it is contemplated to provide a structure that enhances the resolving power for detection without changing the accuracy of the A/D converter 12.

The controller 1B of FIG. 7 comprises an analog amplifier 5*a*, reference voltage generators 7*a* and 7*b*, an analog switch 6, and a digital controller 10B. The digital controller 10B is a digital controller that is internally equipped with an A/D converter, and includes the A/D converter 12 and the position estimator/motor controller 11 shown in the first embodiment.

The signal Vin (i.e. the neutral point potential) inputted to the controller 1B from the voltage division circuit 2 is inputted to the "+" input terminal of the analog amplifier 5*a* as an input signal In1. On the other hand, via the analog switch 6, the output value of the reference generator 7*a* (the reference voltage (⅔) Emax) or the output value of the reference generator 7*b* (the reference voltage (⅓) Emax) is inputted to the "−" input terminal of the analog amplifier 5*a*. The analog amplifier 5*a* is a device that amplifies the value of the difference between the signal In1 inputted to its "+" input terminal and the signal In2 inputted to its "−" input terminal, and that outputs the result as a signal Vin0. This signal Vin0 outputted from the analog amplifier 5*a* is inputted to the digital controller 10B.

Figure 9:
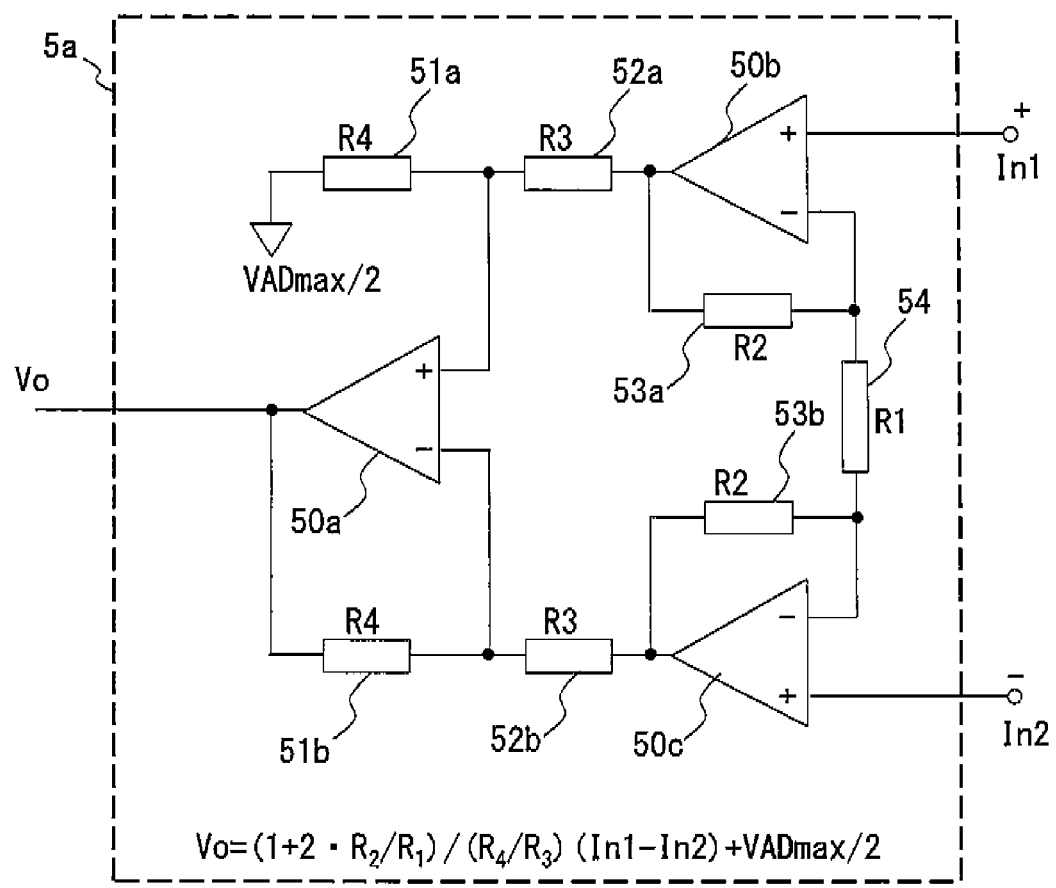

It should be understood that, for example, a differential amplifier like the one shown in FIG. 9 may be used for the analog amplifier 5*a*. The differential amplifier shown in FIG. 9 comprises three operational amplifiers 50*a*, 50*b*, and 50*c* and resistors 51*a*, 51*b*, 52*a*, 52*b*, 53*a*, 53*b*, and 54.

Changing over of the analog switch 6 is performed by a changeover signal SW1 inputted from the controller 1B. The changeover signal SW1 is the same as the one shown in FIG. 6(*c*). When SW1=1 is inputted to the analog switch 6, the reference voltage (⅔) Emax is inputted to the analog amplifier 5*a*. On the other hand, when SW1=0 is inputted to the analog switch 6, the reference voltage (⅓) Emax is inputted to the analog amplifier 5*a*.

Figure 6:
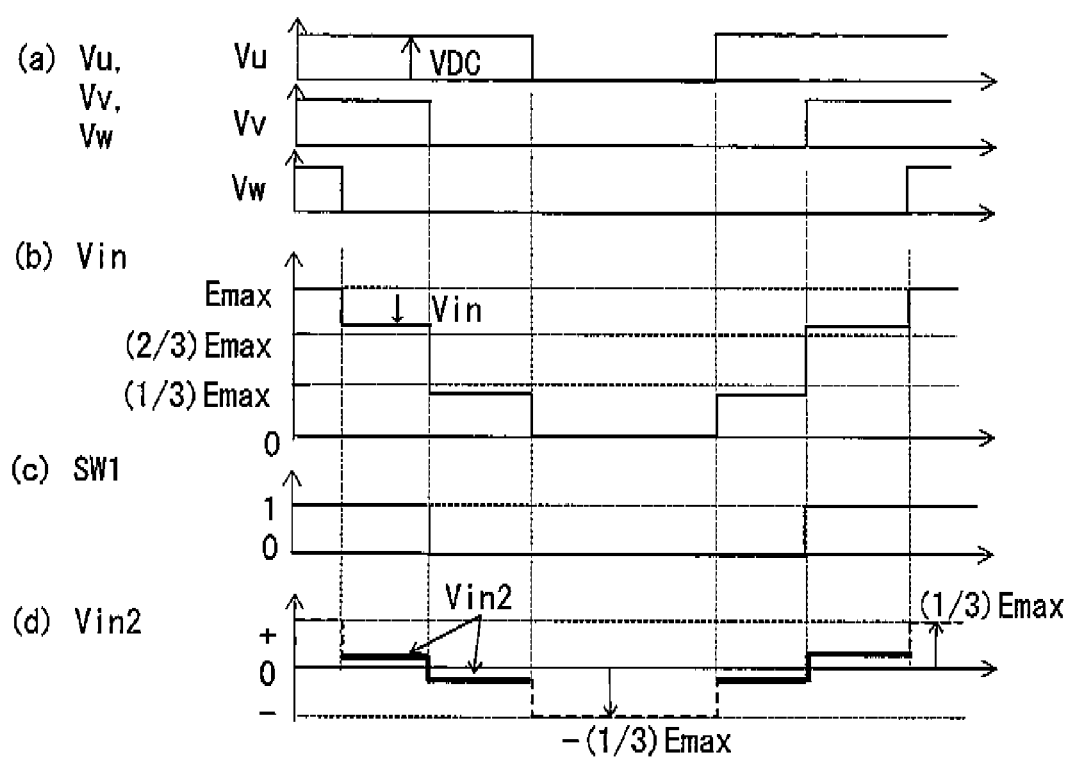
FIG. 6 is a waveform diagram illustrating the operation of various units.
Figure 8:
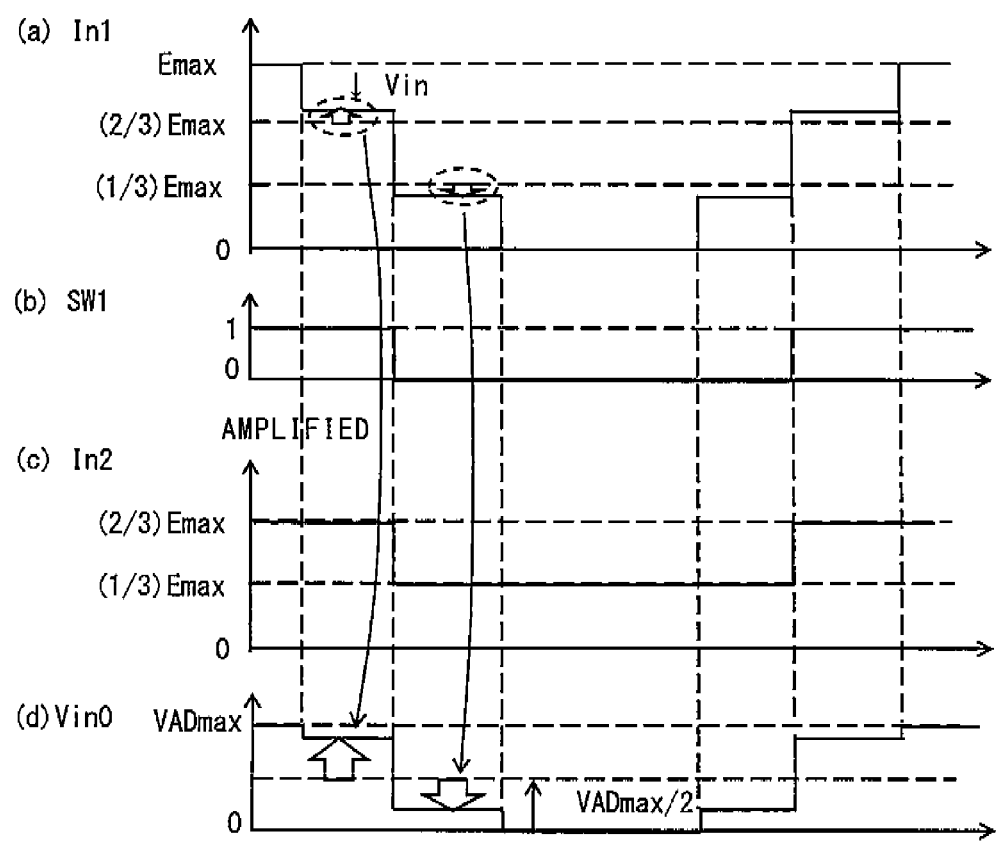
FIG. 8 is a figure for explanation of a signal Vin2 (neutral point potential) that is obtained according to changing over of an analog switch 6.

FIG. 8 is a figure showing a waveform similar to the one shown in FIG. 6 for explanation of the signal Vin2 (i.e. the neutral point potential) obtained due to changing over of the analog switch 6. Vin, which is the input signal In1 inputted to the "+" input terminal of the analog amplifier 5*a*, changes as shown in FIG. 8(*a*). This is the same as shown in FIG. 6(*b*). When the changeover signal SW1 shown in FIG. 8(*b*) is inputted to the analog switch 6, the output of the analog switch 6, in other words the signal In2 at the "−" input terminal of the analog amplifier 5*a*, becomes as shown in FIG. 8(*c*). As a result, the output Vin0 of the analog amplifier 5*a* becomes as shown in FIG. 8(*d*).

It is necessary for the output Vin0 of the analog amplifier 5*a* to be compatible with the input range (0 to VADmax) of the A/D converter of the digital controller 10B. Due to this, it is necessary for the center of the input voltage that is inputted from the analog amplifier 5*a* to the A/D converter to be offset so as to match the intermediate voltage point of the A/D converter input range. This offset can be implemented by setting the potential at the connection point of a resistor 51*a* (R4) to VADmax/2. Moreover, the amplification ratio of the analog amplifier 5*a* should be set so that the width of variation of the neutral point potential after amplification should be contained within the input range of the A/D converter. While the width of variation of the neutral point potential greatly depends upon the characteristics of the magnetic circuit of the motor 4, it is estimated that it will be acceptable for this amplification ratio to be around 5 to 50 times.

As described above, beneficial operational effects similar to those in the case of the first embodiment can be obtained with this second embodiment as well. Moreover, with this second embodiment, it is arranged to use the analog amplifier 5*a* which is a differential amplifier, and to discretize the difference signals between the neutral point potential and the two reference potentials with the A/D converter of the digital controller 10B after they have been amplified. Due to this, it is possible to detect change of the neutral point potential at high accuracy even with an A/D converter of the digital controller 10B whose accuracy is not particularly high, and thereby, without provision of any position sensor, it is possible to implement driving at very low speed in a convenient manner, which was difficult to implement in the conventional device.

Third Embodiment

Figure 10:
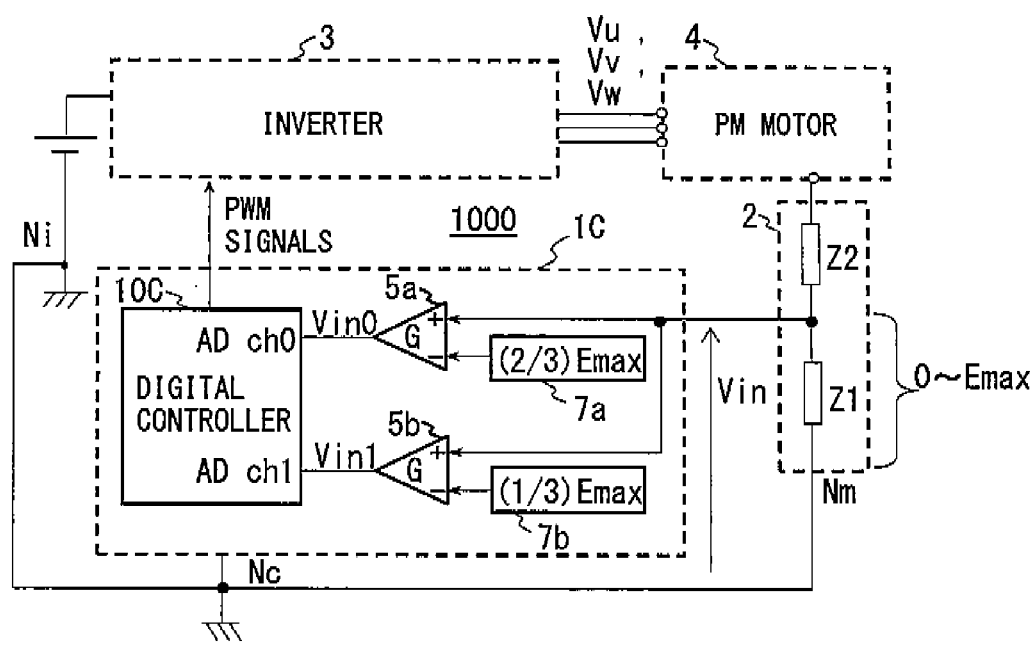
FIG. 10 is a block diagram showing the structure of an electric motor drive device according to a third embodiment of the present invention.

FIG. 10 is a block diagram showing the structure of an electric motor drive device according to a third embodiment of the present invention. This electric motor drive device of the third embodiment has many components in common with the electric motor drive device of the second embodiment shown in FIG. 7. In FIG. 10, the voltage division circuit 2 and the inverter 3 are the same as those shown in FIGS. 1 and 7, while the controller 1B of FIG. 7 is replaced by a controller 1C.

In the second embodiment described above, the difference value of the neutral point potential Vin was obtained by changing over the reference voltage of the analog amplifier 5a with the analog switch 6; but, in this third embodiment, it is arranged to provide two analog amplifiers 5a and 5b externally to the digital controller 10c.

Instead of providing the analog switch 6, the number of analog amplifiers is increased, but in some cases the circuitry becomes simpler. For example because, in a digital controller that includes a microcomputer or the like, it is quite normal for an internal A/D converter to be provided with a plurality of input channels, accordingly this is why it is considered that the alternative of producing a signal for changing over an analog switch would entail more labor. Furthermore since, with analog amplification circuits, there are also single packages in which a plurality of individual amplifiers are housed, accordingly implementation is simple and easy.

With the controller 1C shown in FIG. 10, by adding the analog amplifier 5b, the analog amplifier 5a is made to function as a differential amplifier that takes (⅔) Emax as a reference, while the analog amplifier 5b is made to function as a differential amplifier that takes (⅓) Emax as a reference. The output of the analog amplifier 5a is inputted to an input channel ch0 of the A/D converter of the digital controller 10C, while the output of the analog amplifier 5b is inputted to an input channel ch1 of the A/D converter. According to the switched state of the PWM signals, it is determined which of the signals on channel ch0 and channel ch1 should be selected by the digital controller 10C and A/D converted. As a result, it becomes possible to read in a waveform that is completely equivalent to the one shown in FIG. 4 for the second embodiment into the interior of the digital controller 10C.

As has been explained above, this third embodiment is capable of providing similar beneficial operational effects to those of the first and the second embodiments described above. Furthermore, with this third embodiment, it is possible to omit the analog switch 6 shown in FIG. 7 and to detect change of the neutral point potential at high accuracy, in a similar manner to the case with the second embodiment, so that it is possible to implement motor driving without any position sensor in a convenient manner at ultra low speed, which was difficult to implement in the conventional device.

In a digital controller that includes a microcomputer or the like, it is normal for an internal A/D converter to be provided with a plurality of input channels, and moreover there are also analog amplification circuits in which a plurality of individual amplifiers are housed within a single package. Due to this, it is possible to implement a more convenient circuit in a simple manner with a construction that incorporates two differential amplifiers (i.e. the analog amplifiers 5a and 5b) that correspond to the two reference potentials.

Fourth Embodiment

Figure 11:
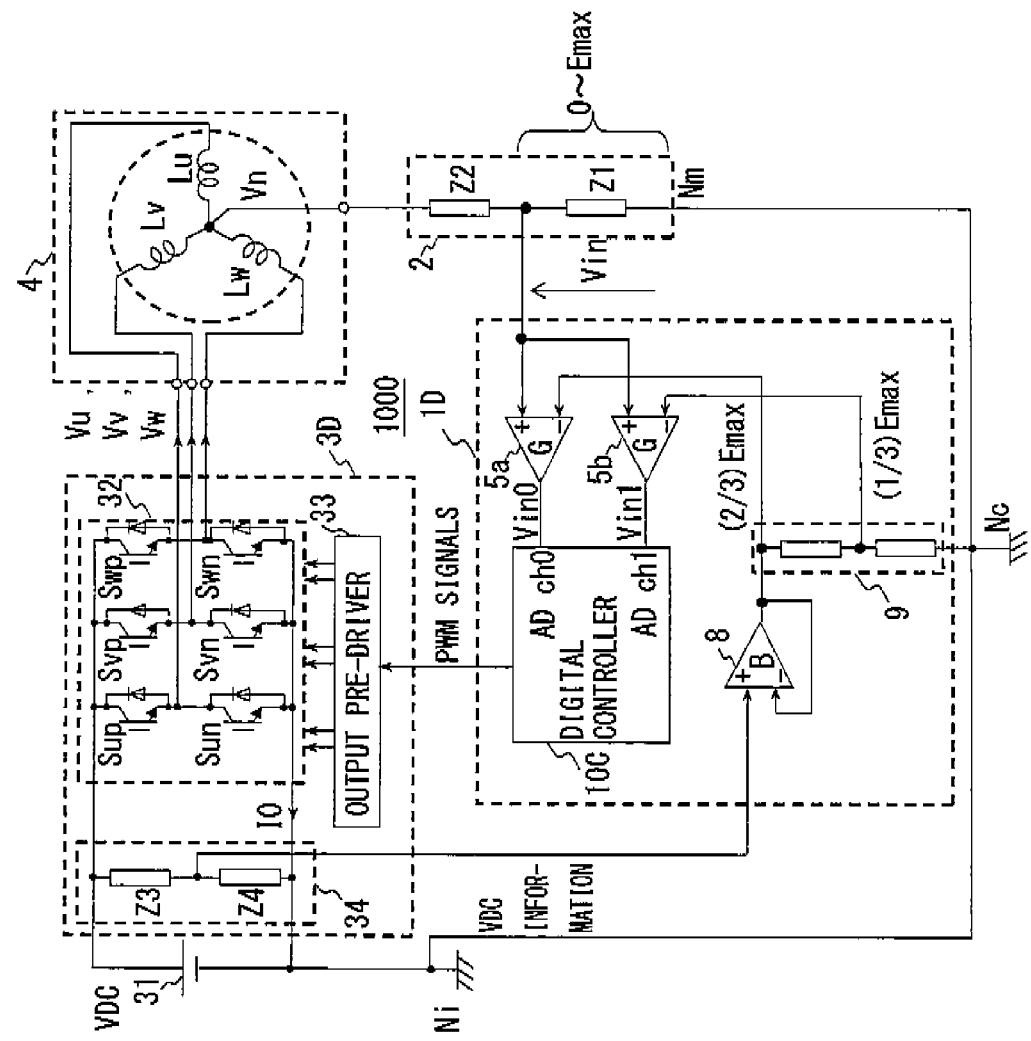
FIG. 11 is a block diagram showing the structure of an electric motor drive device according to a fourth embodiment of the present invention.

FIG. 11 is a block diagram showing the structure of an electric motor drive device according to a fourth embodiment of the present invention. This electric motor drive device of the fourth embodiment has many components in common with the electric motor drive device of the third embodiment shown in FIG. 10. The voltage division circuit 2, the analog amplifiers 5a and 5b of a controller 1D, and the digital controller 10C are the same as those shown in FIG. 10. And, in this embodiment, as shown in FIG. 11, a DC voltage division circuit 34 is provided within an inverter 3D, and a buffer amplifier 8 and a buffer voltage division circuit 9 are provided in the interior of the controller 1D.

With the electric motor drive devices of the first through the third embodiments described above, in each case, it was arranged to provide the reference voltages for the neutral point potential of the motor 4 independently, and to detect the amounts of variation of the neutral point potential at high accuracy. However, with these methods, there is the common problem that the voltage value VDC of the DC power supply 31 for the inverter 3 varies to quite a substantial extent due to variation of the load upon the motor 4 or the like. With an inverter for industrial use or an inverter of a so-called "white goods" type consumer electronic device such as a refrigerator or a washing machine, since the DC power supply 31 is obtained by rectifying the commercial power supply, accordingly, if the voltage of the commercial power supply varies, then the DC voltage value also naturally changes along therewith.

If, as with the electric motor drive devices of the first through the third embodiments, reference voltages are employed that have no relationship to the power supply voltage for the inverter, then the influence of variations of the power supply voltage is not reflected at all in these reference voltages. Furthermore, since as described above the amounts of change of the neutral point potential are minute, accordingly it is easy to mistake a variation of the neutral point potential due to variation of the power supply voltage for a change due to the position of the rotor, and this will exert an influence upon estimation of the position of the rotor.

In this fourth embodiment, in order to solve this problem, the DC voltage division circuit 34 is provided for detecting variations of the inverter DC power supply, and it is arranged to input DC voltage information for the DC power supply line for the inverter 3D (hereinafter this will be termed "VDC information") to the controller 1D. As shown in FIG. 11, the DC voltage division circuit 34 that is provided to the DC power supply line is connected in parallel with the DC power supply 31. The voltage VDC of the DC power supply 31 is divided by this DC voltage division circuit 34, and a voltage (a potential that takes the ground Ni as a reference) determined by the voltage division ratio (Z4/(Z3+Z4)) is inputted to the buffer amplifier 8 of the controller 1D as CVD information.

This voltage that serves as CVD information is amplified by the buffer amplifier 8, and is divided by the buffer voltage division circuit 9 into the reference voltage (⅔) Emax and the reference voltage (⅓) Emax. These reference voltages (⅔) Emax and (⅓) Emax are inputted to the analog amplifiers 5a and 5b that are similar to the ones in FIG. 10, and similar differential amplification is performed.

Since, with this fourth embodiment, the reference voltages (⅔) Emax and (⅓) Emax are generated in this manner on the basis of the DC voltage on the DC power supply line of the inverter 3D, accordingly, if for example the power supply voltage drops, then the reference voltages also decrease together therewith. Moreover, since the voltage divided value Vin of the neutral point potential also decreases according to decrease of the power supply voltage, accordingly it becomes possible still to detect the output of the differential amplifiers (i.e. of the analog amplifiers 5a and 5b) as a "difference". As a result, it is possible to reduce the influence upon position estimation due to variations of the power supply voltage.

As has been explained above, in this fourth embodiment, the DC voltage division circuit 34 that generates a voltage-divided potential by dividing the voltage of the DC power supply 31 is provided, and it is arranged for the two reference potentials (the reference potentials (⅔) Emax and (⅓) Emax) to be generated on the basis of the above voltage-divided potential by the buffer voltage division circuit 9. Due to this, it is possible to detect changes of the neutral point potential of an electric motor at high accuracy without employing any insulating amplifier or any A/D converter or analog switch of high resolving power, and without any error occurring due to variation of the power supply to the inverter, so that it is possible to implement driving at ultra low speed in a convenient manner without the provision of any position sensor, which was difficult to implement in the conventional device.

Fifth Embodiment

Figure 12:
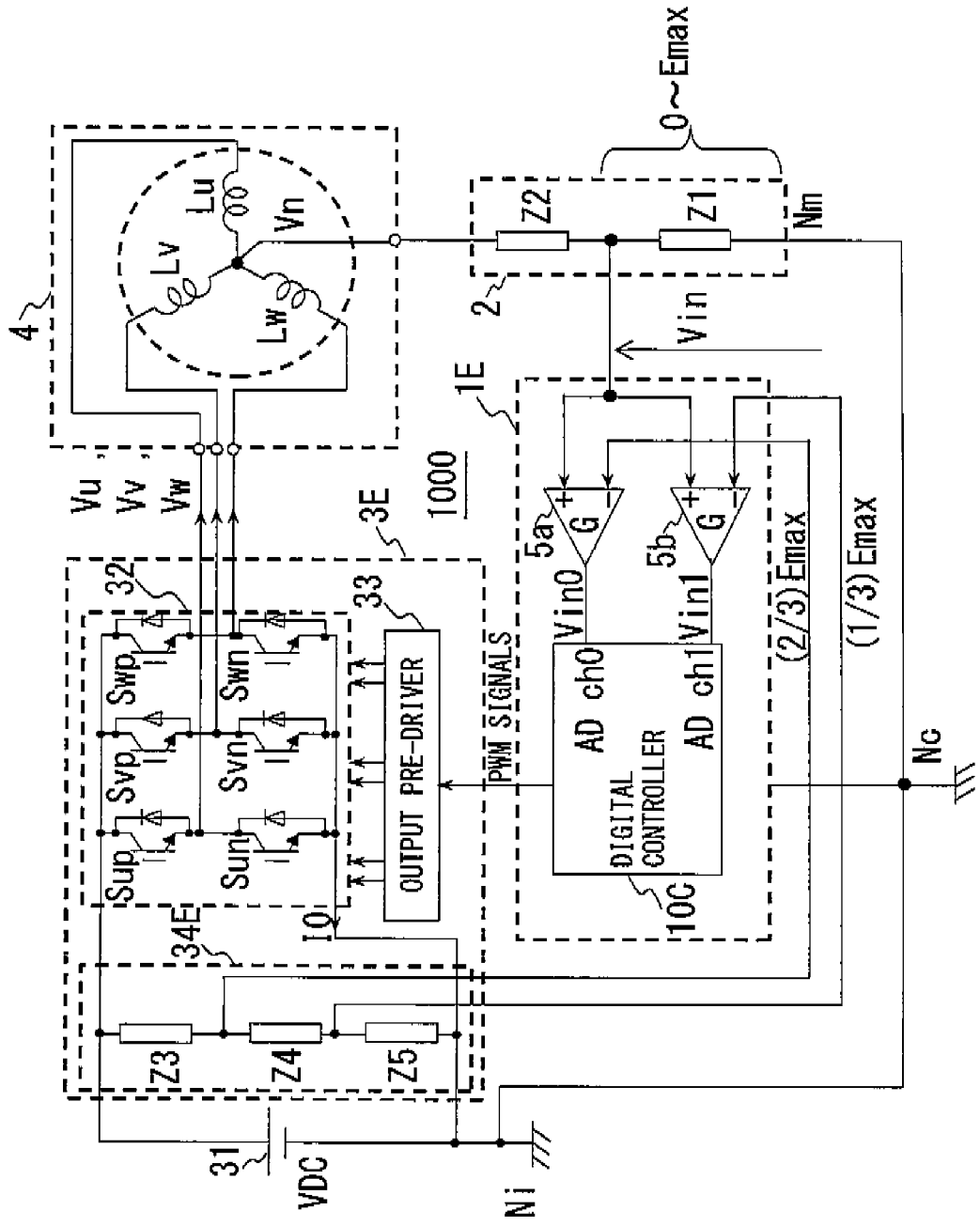
FIG. 12 is a block diagram showing the structure of an electric motor drive device according to a fifth embodiment of the present invention.

FIG. 12 is a block diagram showing the structure of an electric motor drive device according to a fifth embodiment of the present invention. This electric motor drive device of the fifth embodiment shown in FIG. 12 has many components in common with the electric motor drive device of the fourth embodiment shown in FIG. 11: the voltage division circuit 2, the analog amplifiers 5a and 5b, and the digital controller 10C are the same as those shown in FIG. 11. And, in this embodiment, a DC voltage division circuit 34E is provided to an inverter 3E instead of the DC voltage division circuit 34, while the buffer amplifier 8 and the buffer voltage division circuit 9 used in the FIG. 11 structure are omitted.

Now, in implementation of an electric motor drive system, it is desirable to make the circuit structure as simple as possible, and accordingly, by providing a structure like that described above, it is arranged to supply a circuit structure that is yet simpler than the circuit structure of the fourth embodiment.

With the DC voltage division circuit 34E shown in FIG. 12, voltage division points are created at two points by employing three resistors. The voltage division ratios are set so that these voltage divided values become (⅔) Emax and (⅓) Emax. In this embodiment, it is arranged for these two items of voltage information thus created by voltage division to be used as reference voltages by the analog amplifiers 5a and 5b provided to the controller 1E.

As a result, it becomes possible for the operation to be exactly the same as that of the fourth embodiment described above. While in the case of the fourth embodiment the buffer amplifier 8 was required, in the case of this embodiment no buffer amplifier is required. It should be understood that, while the complication of the wiring is increased due to the connections from the voltage division resistors, this will cause no great problem if the present embodiment is applied to an "integrated generator—electric motor system" in which this motor 4 and this electric motor drive device 1000 are integrally structured. What is more important is that, when considered from the point of view of implementation area, this embodiment is preferable because it is possible to reduce the number of components.

As has been explained above, in this fifth embodiment, it is arranged to provide the DC voltage division circuit 34E that divides the voltage of the DC power supply 31, and that generates two voltage-divided potentials as the two reference potentials (⅔) Emax and (⅓) Emax. As a result, it is possible to detect changes of the neutral point potential of a synchronous electric motor at high accuracy with a simple detection circuit, without employing any insulating amplifier or any A/D converter or analog switch of high resolving power, and without any error occurring due to variation of the power supply to the inverter, so that it is possible to implement driving at ultra low speed in a convenient manner without the provision of any position sensor, which was difficult to implement in the conventional device.

Sixth Embodiment

Figure 13:
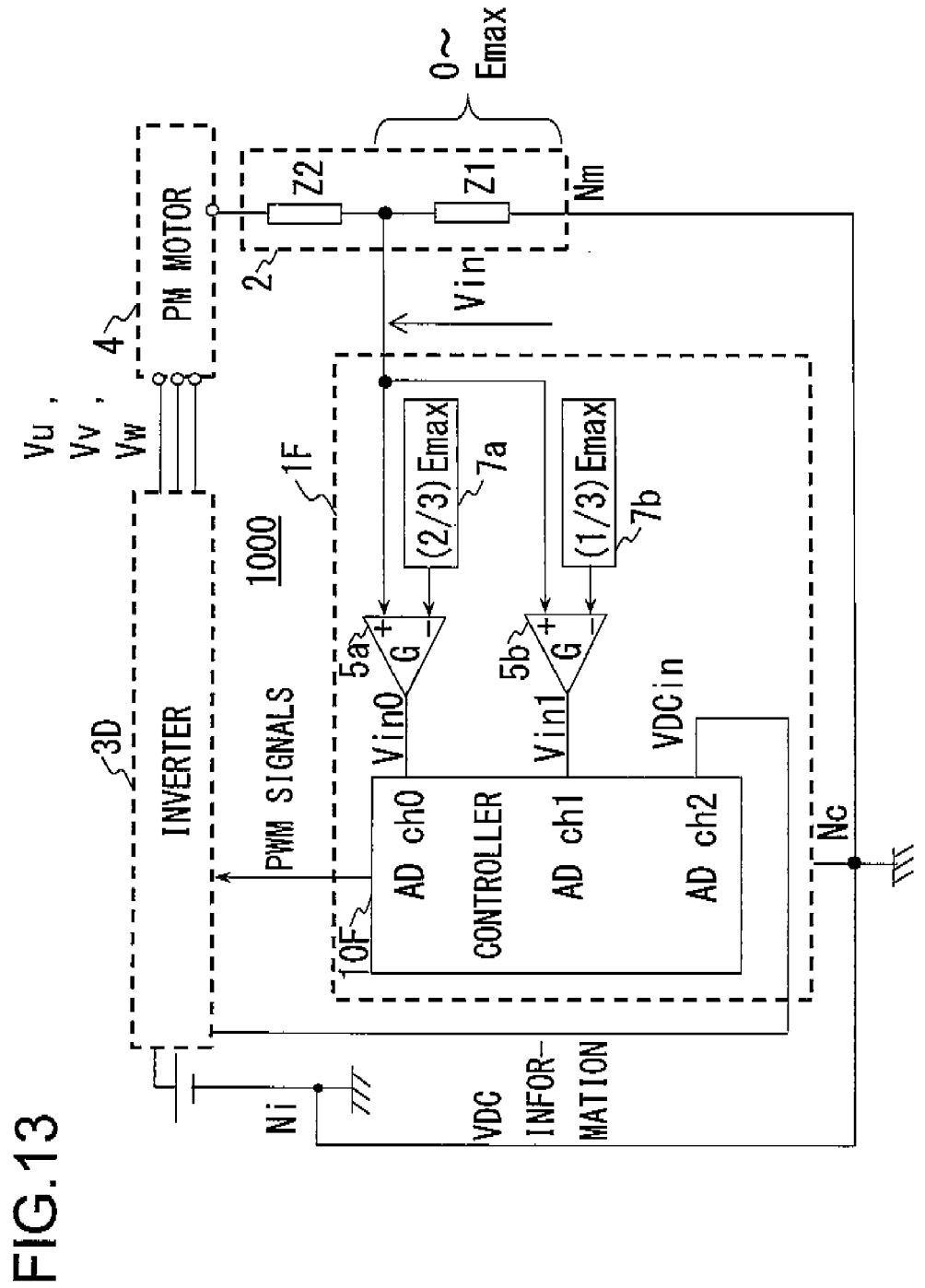
FIG. 13 is a block diagram showing the structure of an electric motor drive device according to a sixth embodiment of the present invention.

FIG. 13 is a block diagram showing the structure of an electric motor drive device according to a sixth embodiment of the present invention. This electric motor drive device of the sixth embodiment has many components in common with the electric motor drive device of the third embodiment shown in FIG. 10: it is arranged to add the DC voltage division circuit 34 shown in FIG. 11 to the structure of FIG. 10, and to input VDC information from this DC voltage division circuit 34 to a digital controller 10F of a controller 1F.

The digital controller 10F is provided with three A/D converter input channels ch0 through ch2. The outputs of the analog amplifiers 5a and 5b are inputted to the input channels ch0 and ch1, in a similar manner to the case in FIG. 10, and the VDC information from the DC voltage division circuit 34 is inputted to the input channel ch2.

Figure 14:
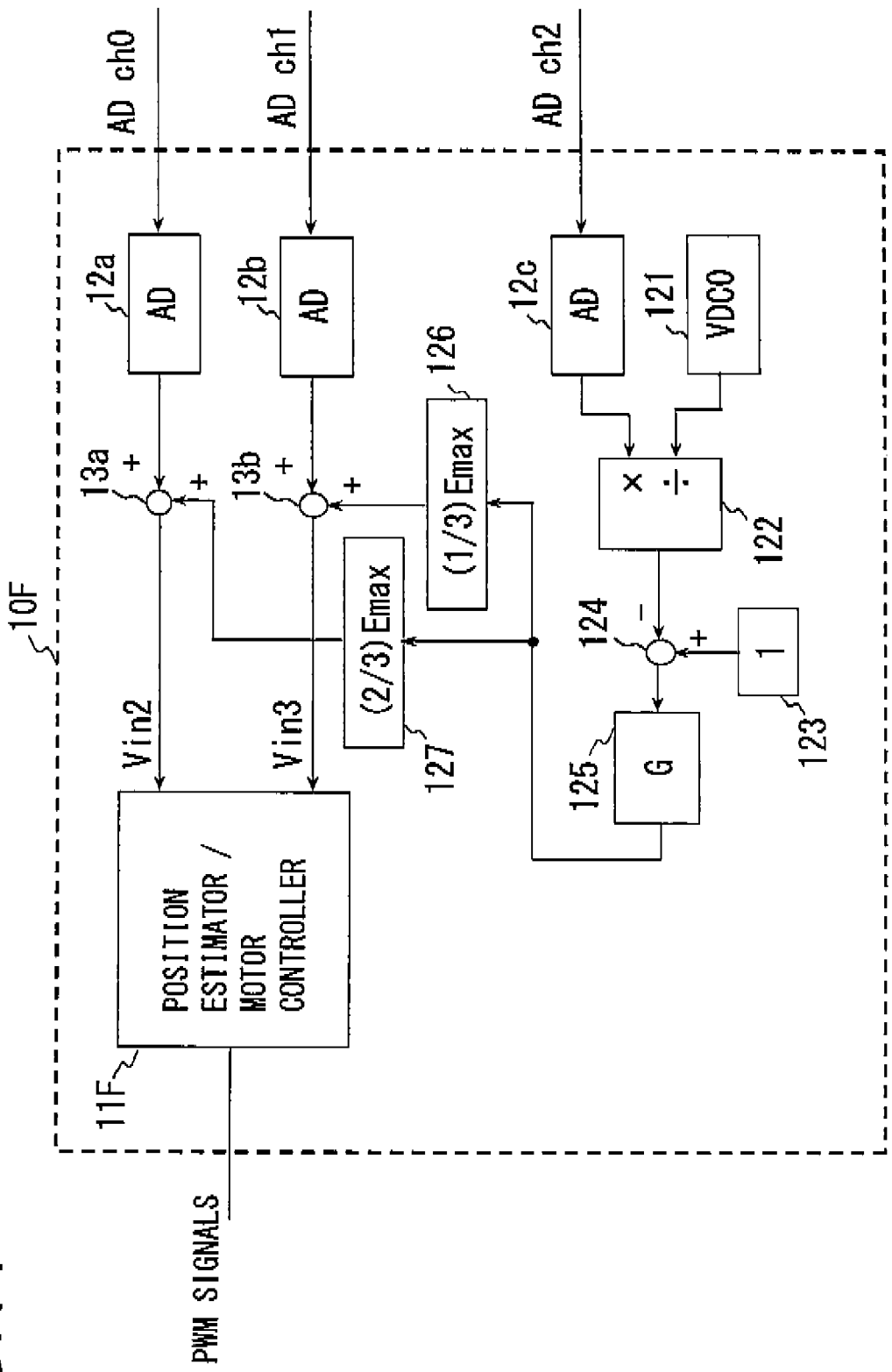
FIG. 14 is a figure showing the block structure of internal processing by a digital controller 10F.

FIG. 14 is a figure showing the block structure of the internal processing of the digital controller 10F. The digital controller 10F comprises a position estimator/motor controller 11F, A/D converters 12a through 12c, adders 13a and 13b, a DC voltage reference value generator 121, a multiplier-divider 122, a "1" generator 123, a subtractor 124, a gain G125, and gain coefficients 126 and 127. It should be understood that, in this block structure, it is anticipated that the portions other than the A/D converters 12a through 12c will in practice be implemented in software.

First, before explanation of the block structure of FIG. 14, the influence of voltage variations of the DC power supply described above will be discussed in detail. The output values of the analog amplifiers 5a and 5b can be expressed as in Equation (4) below. In Equation (4) Vn0 is the output of the amplifier, G is the gain of the amplifier, Vin is the voltage divided value of the neutral point potential of the motor 4, Vinb is the reference voltage, and Eb is the bias value during A/D converter input.

$$Vn0 = G(Vin - Vinb) + Eb \qquad (4)$$

Now, in the cases of the structures shown in FIG. 11 and FIG. 12, the influence of voltage variations of the DC power supply is experienced by the reference potentials as well. Due to this, if the reference value for the DC voltage is termed VDC0 and the actual DC voltage value is termed VDC, and when the amount of variation of the voltage is considered, Vn0 described above has the value Vn1 given by Equation (5) below. When Equation (4) and Equation (5) are compared together, while in appearance the gain seems to vary to some extent, this does not present any great problem.

$$Vn1 = G\{(VDC/VDC0)Vin - (VDC/VDC0)Vinb\} + Eb \qquad (5)$$
$$= G(VDC/VDC0)\{Vin - Vinb\} + Eb$$

However, if the reference voltages are fixed and have no relationship with the DC voltage, like the reference voltages outputted from the reference voltage generators 7a and 7b of FIG. 10, then the output values of the analog amplifiers 5a and 5b become Vn2 as given by Equation (6) below:

$$Vn2 = G\{(VDC/VDC0)Vin - Vinb\} + Eb \quad (6)$$

and the error Ve relative to Vn1 of Equation (5) is as given by Equation (7):

$$\begin{aligned} Ve &= Vn1 - Vn2 \quad (7)\\ &= G \cdot Vinb - G \cdot (VDC/VDC0)Vinb \\ &= G \cdot \{1 - (VDC/VDC0)\}Vinb \end{aligned}$$

Accordingly, since Vn1 is given by Equation (8) below, the proper value of Vn1 may be obtained by correcting Vn2.

$$Vn1 = Vn2 + Ve \quad (8)$$

Since, in the equations given above Vinb represents the two reference voltages (⅔) Emax and (⅓) Emax, therefore each of them should be corrected according to Equation (7). When these equations (7) and (8) are expressed as a block diagram, FIG. 14 results.

In other words, the value of the DC voltage VDC is A/D converted and quantized by the A/D converter 12c, and is inputted to the multiplier-divider 122 as VDC of Equation (5). The reference value VDC0 is also inputted to the multiplier-divider 122 from the DC voltage reference value generator 121, and VDC/VDC0 is calculated by the multiplier-divider 122. Then VDC/VDC0 is subtracted by the subtractor 124 from a value of 1 that is inputted from the "1" generator 123, and the result is inputted to the gain G125. Accordingly, G·{1−(VDC/VDC0)} is outputted from the gain G125, and the errors Ve given by Equation (7) above are outputted from the gain coefficients 126 and 127. These errors Ve are added to the outputs of the A/D converters 12a and 12b (i.e. to Vn2 shown in Equation (6)) by the adders 13a and 13b. As a result, the neutral potential signals Vin2 and Vin3 in which the influence of the amount of voltage variation has been corrected are inputted to the position estimator/motor controller 11F.

As explained above, in this sixth embodiment, the DC voltage division circuit 34 that generates a voltage-divided potential by dividing the voltage of the DC power supply 31 is provided, and it is arranged to correct a difference signal based upon this voltage-divided potential that has been A/D converted so that the influence of power supply voltage variation is reduced, and to estimate the position of the rotor on the basis of this corrected difference signal. As a result, it is possible to correct changes of the neutral point potential of the electric motor at high accuracy with a simple detection circuit so that no error occurs even in the case of variation of the voltage of the power supply to the inverter 3D, and it is possible to implement motor driving without any position sensor in a convenient manner at ultra low speed, which was difficult to implement in the conventional device.

Seventh Embodiment

Figure 15:
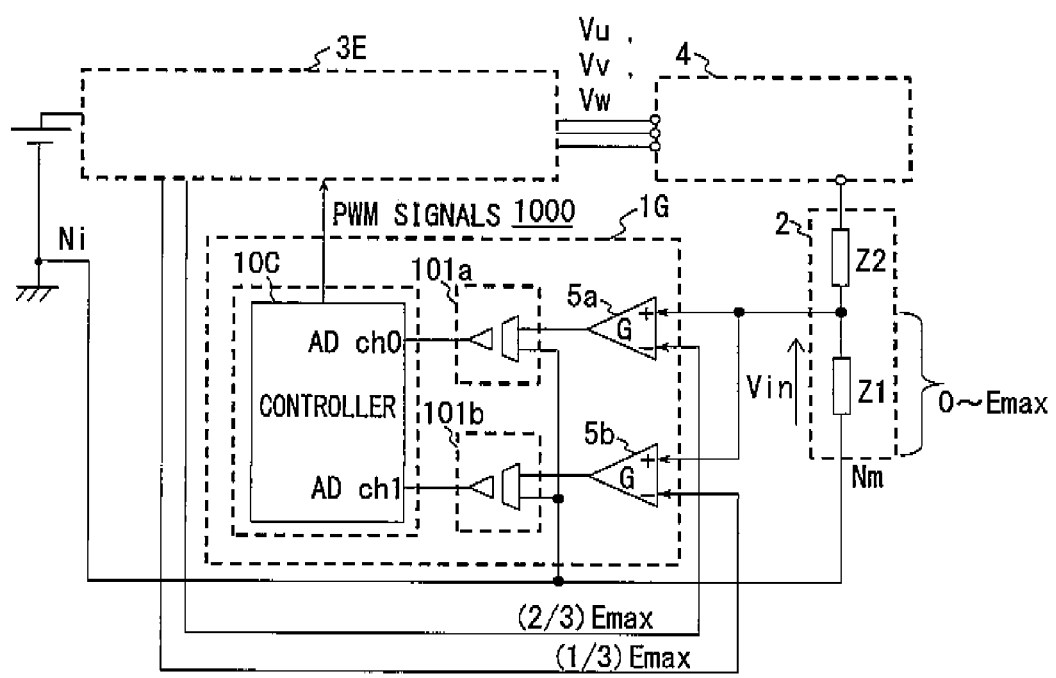
FIG. 15 is a block diagram showing the structure of an electric motor drive device according to a seventh embodiment of the present invention.

FIG. 15 is a block diagram showing the structure of an electric motor drive device according to a seventh embodiment of the present invention. This electric motor drive device of the seventh embodiment has many components in common with the electric motor drive device of the fifth embodiment shown in FIG. 12, and insulating amplifiers 101a and 101b are added to the structure of FIG. 12. In other words, it is arranged to input the outputs of the analog amplifiers 5a and 5b to the digital controller 10C via these insulating amplifiers 101a and 101b.

Figure 27:
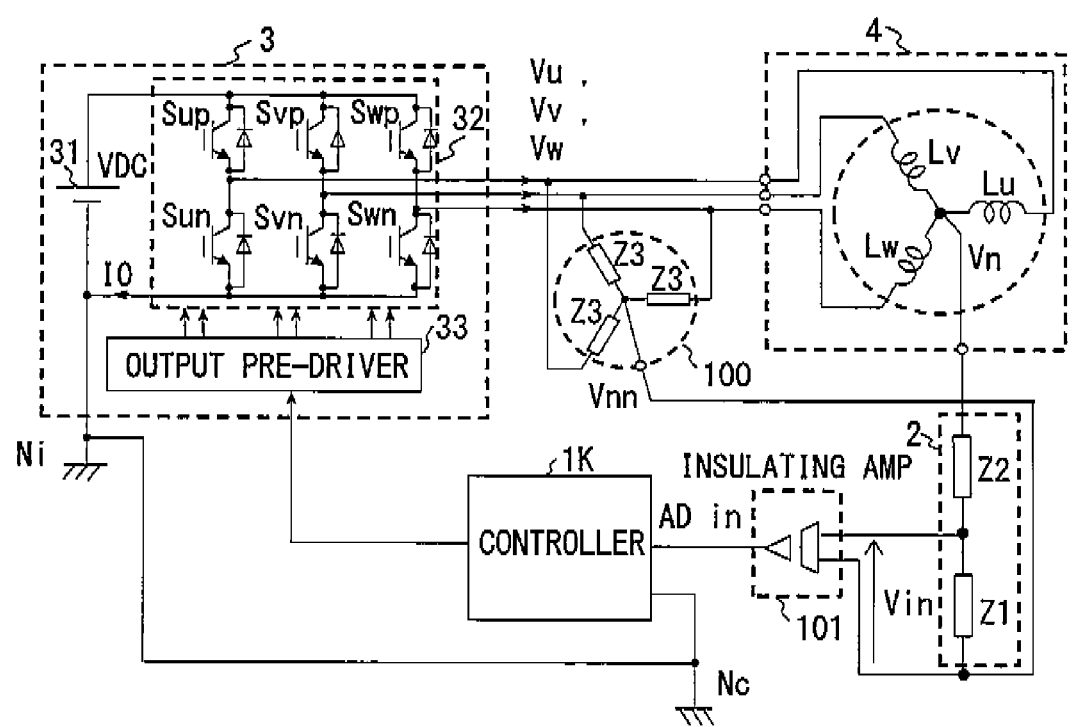
FIG. 27 is a figure showing an example of a conventional synchronous electric motor drive system.
Figure 28:
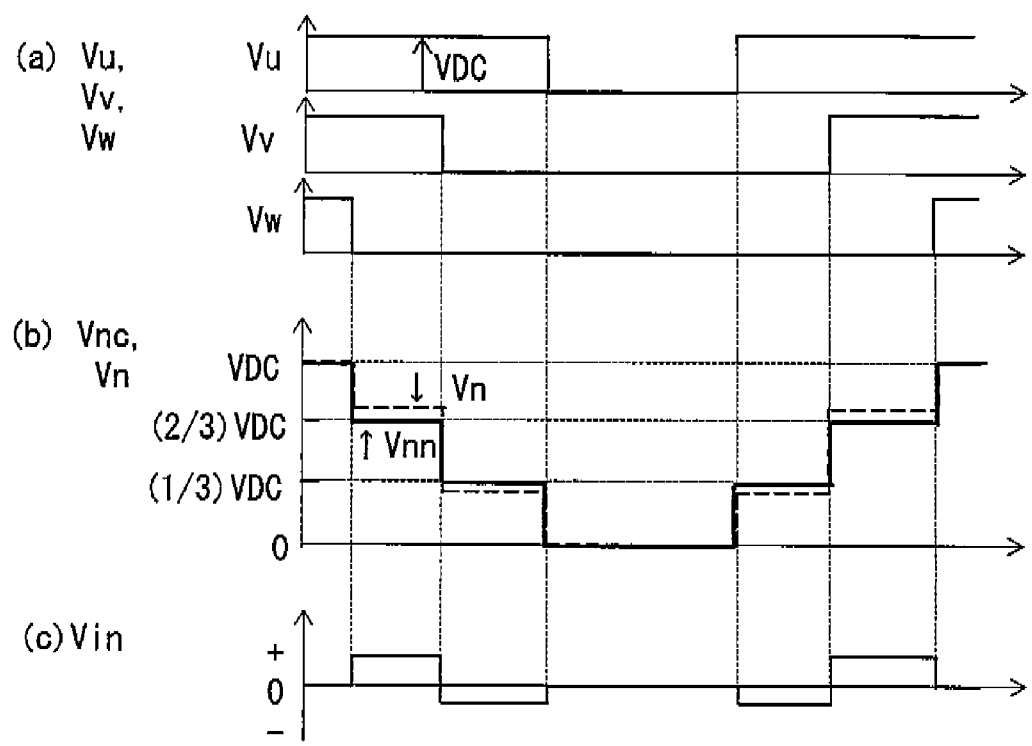
FIG. 28 is a figure showing the drive waveform of this conventional synchronous electric motor drive system.

In the case of a structure such as that shown in FIG. 27 in which the neutral point potential of a permanent magnet motor is detected by taking a virtual neutral point potential as a reference, an insulating amplifier is essential, since the virtual neutral point potential varies greatly over the range of the power supply voltage. And, since the reference potential of the virtual neutral point potential (i.e. the virtual neutral point potential) varies greatly, accordingly, in order to enable the insulating amplifier to operate in a stable manner, it is necessary to implement countermeasures against noise by paying sufficient attention to implementation of the circuitry.

However in this embodiment the reference potential is extremely stable, since, instead of employing the virtual neutral point potential as the reference potential, a fixed value that does not depend upon the switched state of an inverter 3E is employed. Due to this, and with the insulating amplifiers 101a and 101b being used as shown in FIG. 15, the noise countermeasures that need to be implemented are extremely simple, and the result is a detection circuit that is resistant to noise. While it is not possible to avoid an increase in cost due to provision of these insulating amplifiers, it is thereby possible to implement insulation from the digital controller 10C, so that the merit is high from the point of view of ensuring safety.

As described above, according to this seventh embodiment, it is possible to detect the neutral point potential without using any A/D converter having high resolving power or any analog switch, and furthermore with it being difficult for any influence to be experienced due to variation of the power supply to the inverter or due to noise, so that it is possible to implement motor driving without any position sensor in a convenient manner at ultra low speed, which was difficult to implement in the conventional devicet.

Eighth Embodiment

Figure 16:
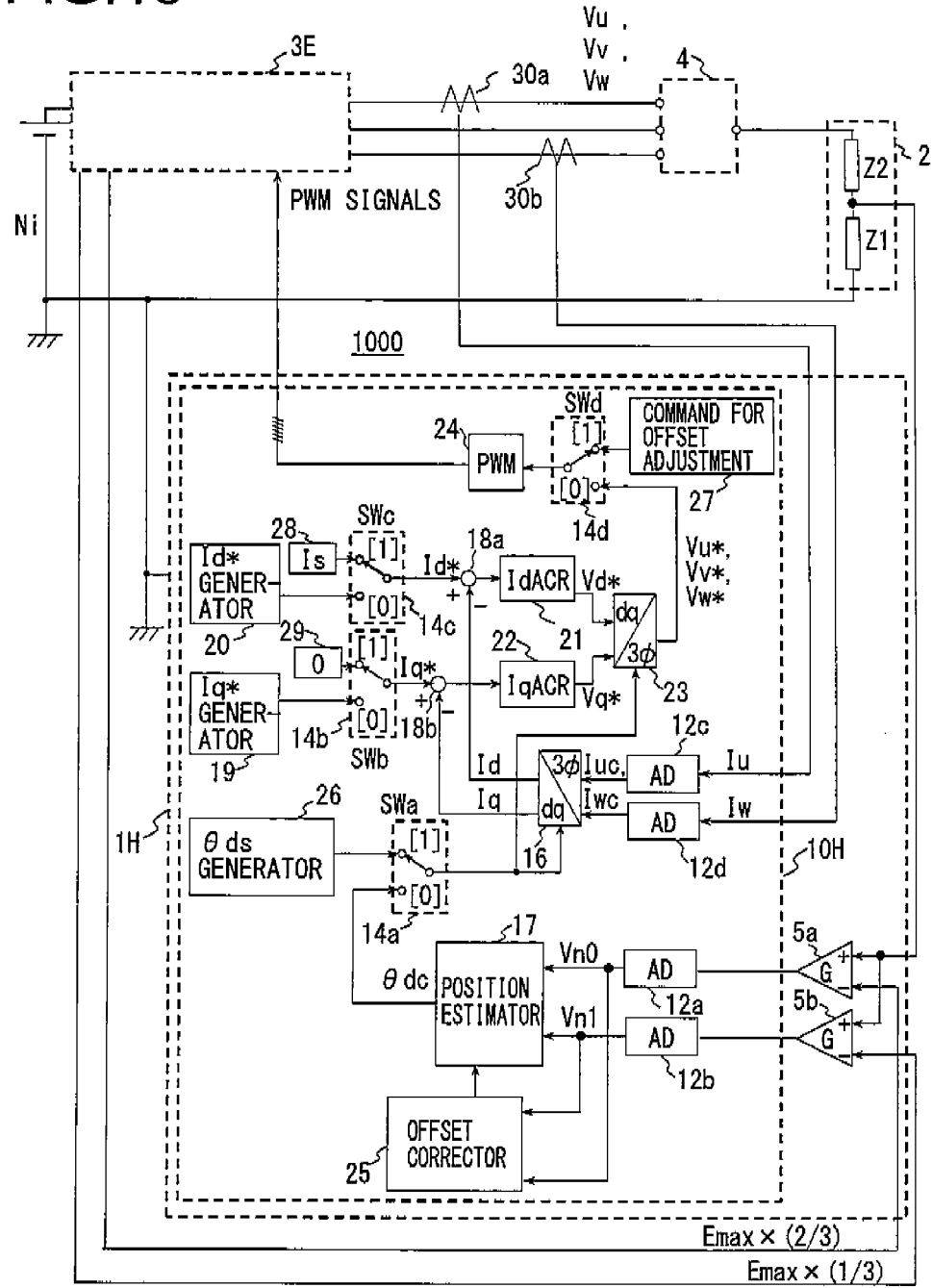
FIG. 16 is a block diagram showing the structure of an electric motor drive device according to an eighth embodiment of the present invention.

FIG. 16 is a block diagram showing the structure of an electric motor drive device according to an eighth embodiment of the present invention. This electric motor drive device of the eighth embodiment has many components in common with the electric motor drive device of the fifth embodiment shown in FIG. 12, and results therefrom due to addition of phase current sensors 30a and 30b that detect the phase currents of the motor 4. In this embodiment, the distinctive feature is the structure of a digital controller 10H, and these blocks are principally implemented in software, with the exception of the A/D converters and the portions that generate the PWM signals.

Now, the problem that arises in practice in relation to the circuitry for detecting the neutral point potential of the motor 4 is that of detection errors characteristic of analog circuitry. In particular, it is necessary to correct the offset value, and it becomes impossible to calculate an accurate estimate of the rotor position on the basis of the neutral point potential if this correction is not performed. As will be described hereinafter, this embodiment is distinguished by a structure related to offset adjustment.

First, the structure of a controller 1H will be explained. As explained in connection with the fifth embodiment, the A/D converters 12a and 12b are devices that discretize the amount of variation of the neutral point potential. Moreover, A/D converters 12c and 12d are housed internally to the controller, and discretize the detected values of Iu and Iw of the motor 4. Furthermore, in this embodiment, an offset corrector 25, a Ads generator 26, an offset adjustment command generator 27, a current command generator 28 for position determination, a zero generator 29, and changeover switches 14a through 14d are added, and provide the very important function of performing offset adjustment during sensor-less rotor position detection.

As described above, the amount of variation of the neutral point potential changes with respect to the rotor phase θd as shown in FIG. 5. Although the detection circuit is designed so that the center value of the variation component is 512 with an input range of ten bits (i.e. 1024) for the waveform of FIG. 5, it is understood that actually an offset amount will be present. If this offset is not corrected, then the problem arises that an estimation error will occur when an estimate of the rotor position is calculated. Thus, in this embodiment, it is arranged to perform this offset correction automatically.

First, offset compensation is performed in a step before actual operation of the permanent magnet motor 4. At this time, the changeover switches 14a, 14b, and 14c shown in FIG. 16 are changed over to their "1" sides. These changeover switches 14a, 14b, and 14c are at their "0" sides during normal operation. However, only the changeover switch 14d is left at its "0" side.

When the changeover switches 14a through 14d have been put in this state, a phase command that keeps the rotor fixed is outputted from the θds generator 26. By putting the changeover switches 14b and 14c to their "1" sides, the command Is generated by the current command generator 28 for position determination and a zero signal generated by the zero generator 29 are inputted to adders 18a and 18b. In other words, the inputs Iq* and Id* to the adders 18a and 18b become Iq*=0 and Id*=Is. Due to this, only the current Id flows to the motor, and the rotor is attracted to the phase at which the current Id flows and stops there. Thereby, so called "DC position determination operation" is executed.

And, at the time point that position determination has been performed, the changeover switch 14d is changed over to its "1" side, and a command (a voltage command) is outputted from the offset adjustment command generator 27 such that the voltage vectors V(1,0,0) and V(1,1,0) are alternatingly applied. In other words, voltage commands Vu*, Vv*, and Vw* like those shown in FIG. 4(a) are inputted to a PWM generator 24 from the offset adjustment command generator 27. As a result, it is possible to acquire the amount of variation of the neutral point voltage when the rotor is positioned at Ad. The neutral point potential is detected while changing the voltage command outputted from the offset adjustment command generator 27 and varying the position of the rotor a little at a time, and a waveform like the one shown in FIG. 5 is acquired. And, finally, it is possible to obtain the offset amount from the average value of the waveform shown in FIG. 5.

Figure 17:
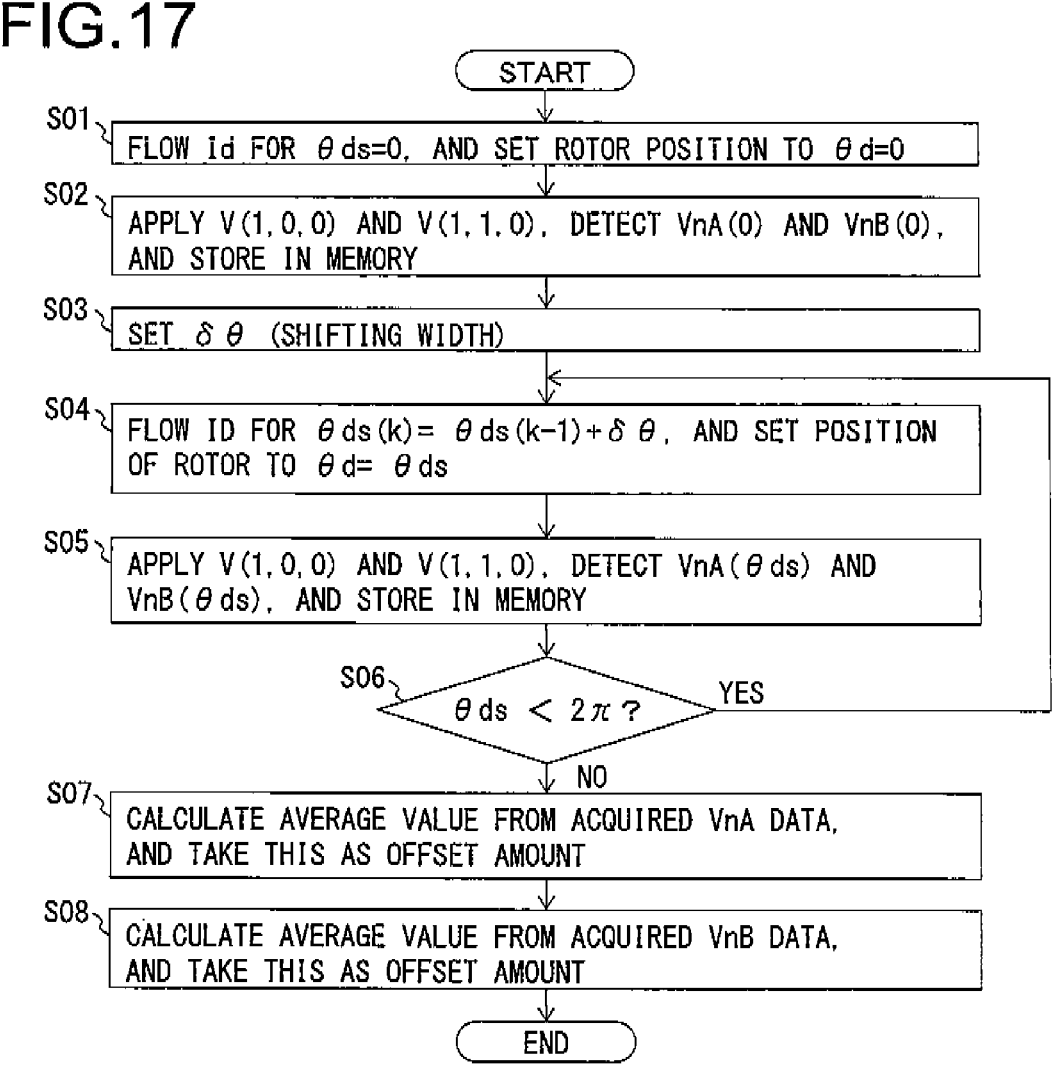
FIG. 17 is a flow chart showing operation for offset amount calculation.
Figure 18:
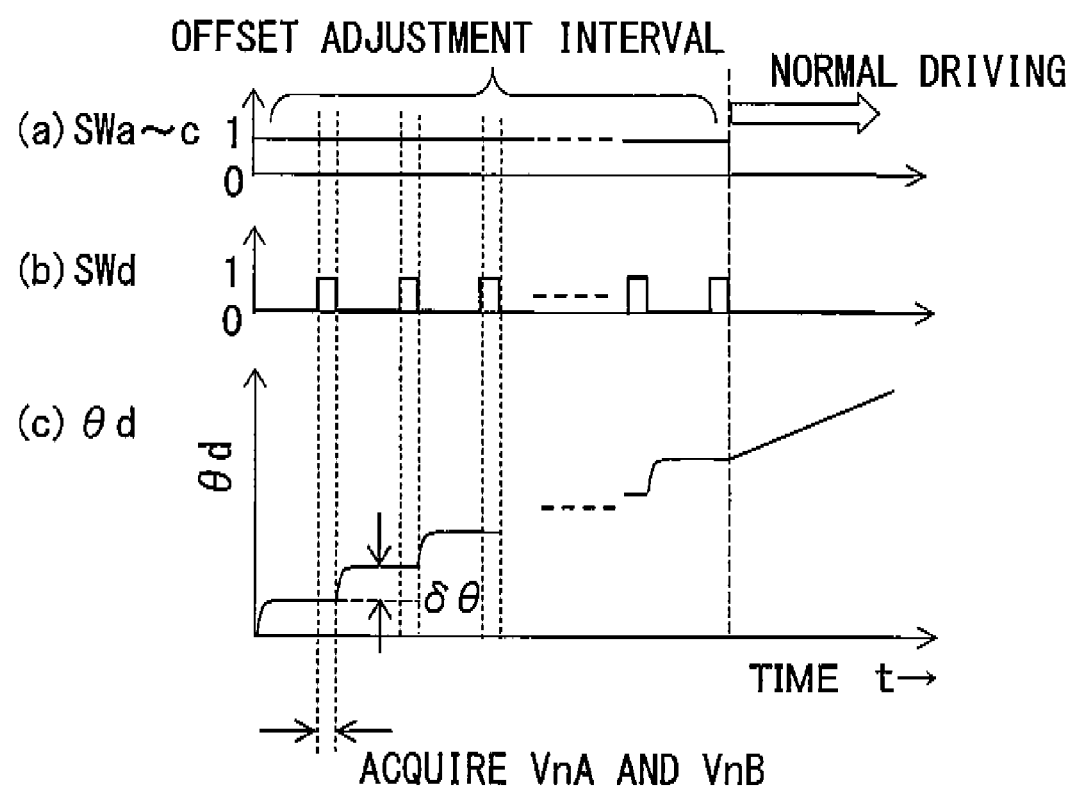
FIG. 18 is a figure showing a waveform during offset adjustment.

FIG. 17 is a flow chart showing the offset amount calculation operation. Moreover, FIG. 18 is a figure showing the waveform during offset adjustment. In FIG. 17, in step S01, θds=0 is outputted from the θds generator 26, the current Id=Is is flowed and the rotor is moved, and thereby the rotor position is set to the position θd=0. Then in step S02, by changing over the changeover switch 14d to its "1" side, two voltage vectors (for example, the voltage vectors V(1,0,0) and V(1,1,0) shown in FIG. 4) are applied, and the amount of variation of the neutral point potential at that time, in other words at θd=0, is acquired.

Next, in step S03, a shifting width δθ is set for varying the value of θds. The smaller the value of this shifting width δθ is, the better is the accuracy of calculation of the offset amount; but, on the other hand, the smaller the shifting width is made, the longer the time period for acquiring the offset amount becomes. Due to this, it is preferable for this shifting width to be around 10° to 30° of electrical angle.

Then in step S04 the shifting width δθ is added to the previous value θds(k−1) of θds, and the position of the rotor is set to this θds(k). Next in step S05 the changeover switch 14d is changed over to its "1" side and the two voltage vectors are applied, and the amount of variation of the neutral point potential at θds(k) is acquired. The amount of variation of the neutral point potential that has been acquired is stored in a memory provided to the digital controller 10H.

In step S06, a decision is made as to whether or not θds<2π. In relation to θds, θds is set to 0 (θds=0) in step S01, and each time the processing of step S04 is executed the shifting width δθ is added thereto. In the case of the state θds<2π, an affirmative decision is reached in step S06, and the processing of steps S04 and S05 is repeatedly executed. On the other hand, when θds>2π, a negative decision is reached in step S06, and the flow of control proceeds to step S07. By steps S04 and S05 being repeatedly executed, the amounts of variation VnA and VnB for a plurality of rotor positions in the range 0<θds<2π come to be stored in the memory.

In step S07, the average value of the plurality of amounts of variation VnA is calculated from the plurality of amounts of variation VnA that have been acquired, and this is taken as an offset amount. Then in a similar manner, in step S08, the average value related to the amounts of variation VnB is calculated and is taken as an offset amount. Determination of the offset amounts is completed by the processing steps shown in FIG. 17.

FIG. 18 is a figure showing, during the determination of the offset amounts, the states SWa through SWc of the changeover switches 14a through 14c (FIG. 18(a)), the state SWd of the changeover switch 14d (FIG. 18(b)), and the change of the phase θd of the rotor (FIG. 18(c)). During the offset adjustment interval, the changeover switches 14a through 14c are always at their "1" sides, and the d axis current Id flows continuously. The rotor of the motor 4 rotates by steps, according to the value θds generated by the θds generator 26. At the timing that the rotor position is fixed, the changeover switch 14d is changed over to its "1" side, and VnA and VnB, which are the amounts of variation of the neutral point potential, are acquired. After the offset adjustment has been completed, the system changes over to normal driving by the changeover switches 14a through 14d being changed over to their "0" sides.

As has been explained above, in this eighth embodiment, it is arranged to provide the offset corrector 25 that, before starting of the motor 4, along with detecting the neutral point potential, also corrects the offset component of the neutral point potential. Thus, since it is arranged to detect the corresponding neutral point potentials while setting the rotor to a plurality of rotational positions in order, and to correct the offset component on the basis of this plurality of neutral point potentials that have been detected, accordingly it is possible to correct the offset component, and to implement motor driving without any position sensor at higher accuracy at low speed.

Ninth Embodiment

Figure 19:
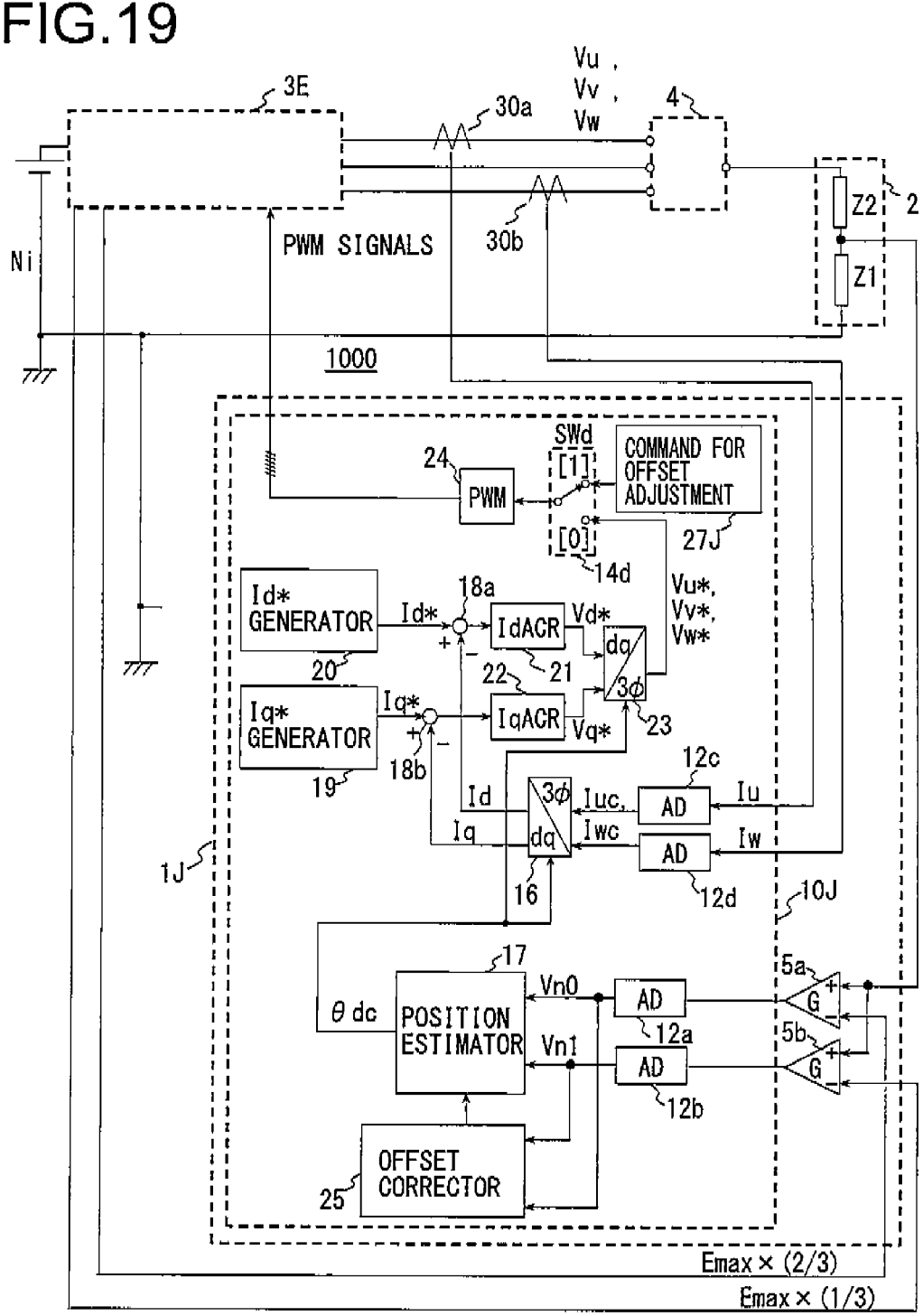
FIG. 19 is a block diagram showing the structure of an electric motor drive device according to a ninth embodiment of the present invention.

A ninth embodiment of the present invention will now be explained. This electric motor drive device of the ninth embodiment shown in FIG. 19 has many components in common with the electric motor drive device of the eighth embodiment shown in FIG. 16. A digital controller 10J shown in FIG. 19 results by eliminating the changeover switches 14a through 14c, the θs generator 26, the current command generator 28 for position determination, and the zero generator 29 from the digital controller 10H shown in FIG. 16. Moreover, instead of the offset adjustment command generator 27 of FIG. 16, an offset adjustment command generator 27J that operates differently is provided.

In the eighth embodiment described above, it is arranged to perform neutral point offset adjustment by setting the position of the rotor to a plurality of positions before actual operation of the motor 4. For this, it is necessary for this system to be one in which the rotor of the motor 4 can be moved freely. Due to this fact, it is not possible to apply the technique explained in connection with the eighth embodiment in the case of a system in which the motor cannot freely be moved, such as, for example, a conveyor or a robot arm.

Figure 20:
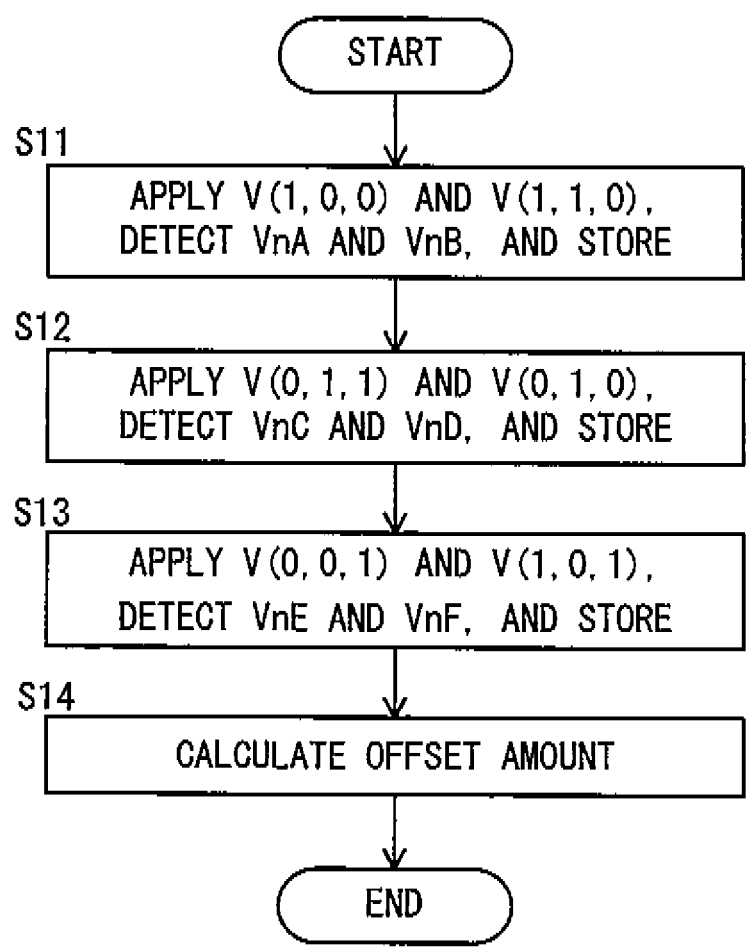
FIG. 20 is a flow chart showing an offset adjustment method in the ninth embodiment.

On the other hand, in this embodiment, it is possible to perform detection and adjustment of the offset of the neutral potential detection circuit without moving the rotor of the motor 4. In the case of the structure shown in FIG. 19, when performing offset adjustment, the changeover switch 14d is changed over to its "1" side, so that the three phase voltage commands are supplied to the PWM generator 24 from the offset adjustment command generator 27J. And application of voltage commands and acquisition of the amount of variation of the neutral point potential are performed according to the flow shown in FIG. 20, In step S11, the offset adjustment command generator 27J outputs voltage commands Vu*, Vv*, and Vw* such that voltage vectors V(1,0,0) and V(1,1,0) as shown in FIG. 4(c) are applied. And the amounts of variation VnA and VnB of the neutral point potential generated at this time are detected, and are stored in the memory. In relation to the voltage commands Vu*, Vv*, and Vw*, it should be understood that settings like Vu*=-Vw* and Vv*=0 in FIG. 4(a) are made, since some torque is undesirably generated by the motor 4 if voltages whose average is zero are not applied.

Figure 21:
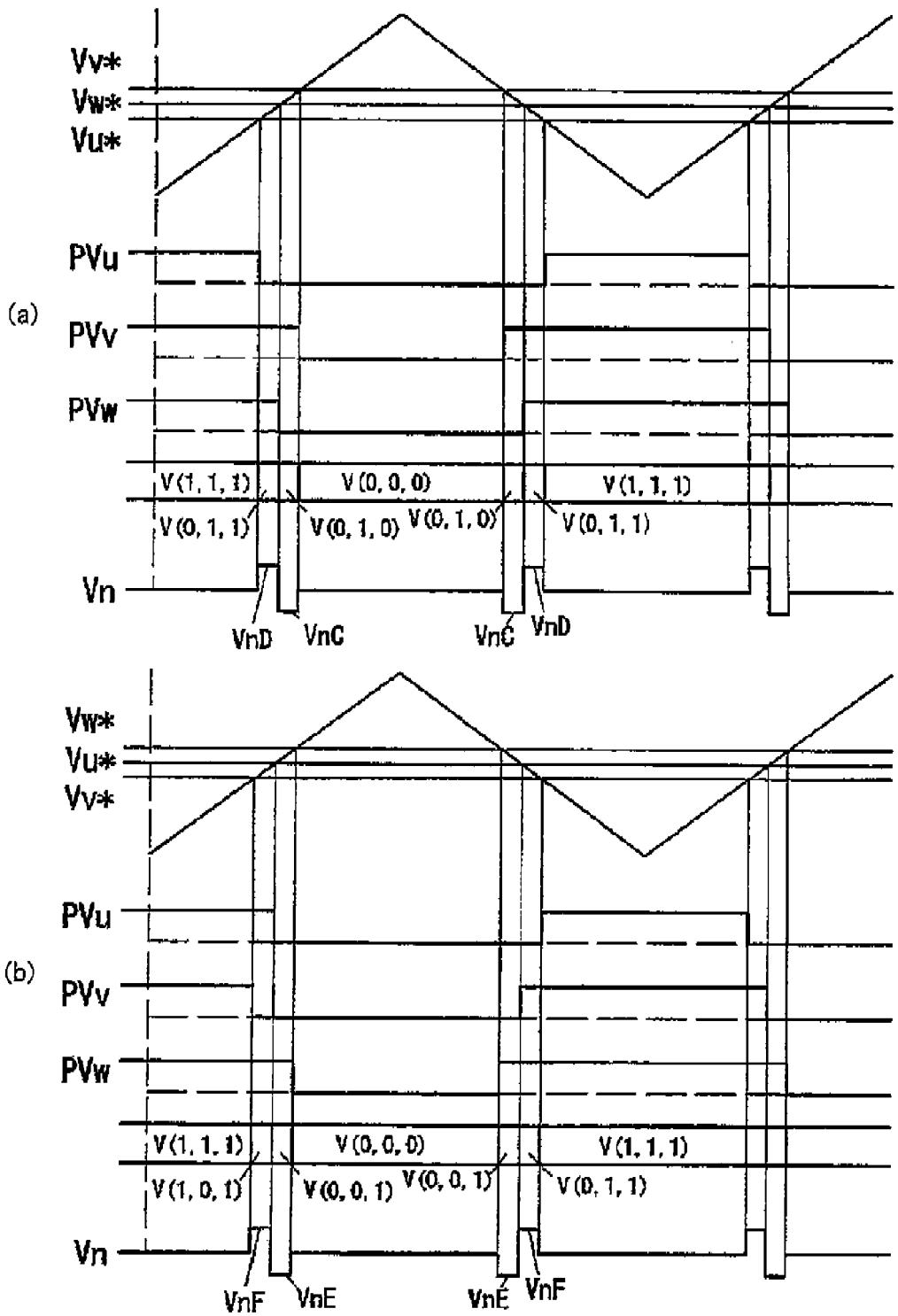
FIG. 21 is a figure showing voltage commands Vu*, Vv*, and Vw* during offset adjustment.

Then in step S12 voltage commands Vu*, Vv*, and Vw* such that voltage vectors V(0,1,0) and V(0,1,1) as shown in FIG. 21(a) are applied are outputted from the offset adjustment command generator 27J. And the amounts of variation (VnC and VnD) of the neutral point potential generated at this time are detected, and are stored in the memory. Then in step S13 voltage commands Vu*, Vv*, and Vw* such that voltage vectors V(0,0,1) and V(1,0,1) as shown in FIG. 21(b) are applied are outputted from the offset adjustment command generator 27J. And the amounts of variation (VnE and VnF) of the neutral point potential generated at this time are detected, and they are stored in the memory. Finally in step S14 the average value of the amounts of variation VnA through VnF of the amounts of variation of the neutral point potential that have been detected is calculated, and the result is stored as the offset amount.

By doing this, it is possible to obtain an alternative value for the offset amount. Although the detected values VnA through VnF are information at a coarse resolution of 60°, it is possible to obtain an offset value with this type of method. Furthermore since the rotor is not moved in the method described above, accordingly this method can be applied even to an electric motor that is employed in a system that is limited by a condition like that described above.

As has been explained above, with the ninth embodiment, it is arranged to provide the offset corrector 25 that, before starting of the motor 4, corrects the offset component of the neutral point potential generated when detecting the neutral point potential. And it is arranged to output a plurality of voltage commands in order from the offset adjustment command generator 27J, which is a voltage command output unit, and to correct the offset component on the basis of the neutral point potentials that are detected during the output of these voltage commands. Due to this, it is possible to acquire the offset component even for a system in which it is not possible to move the rotor, so that it is possible to implement motor driving without any position sensor at low speed at higher accuracy.

Tenth Embodiment

Figure 22:
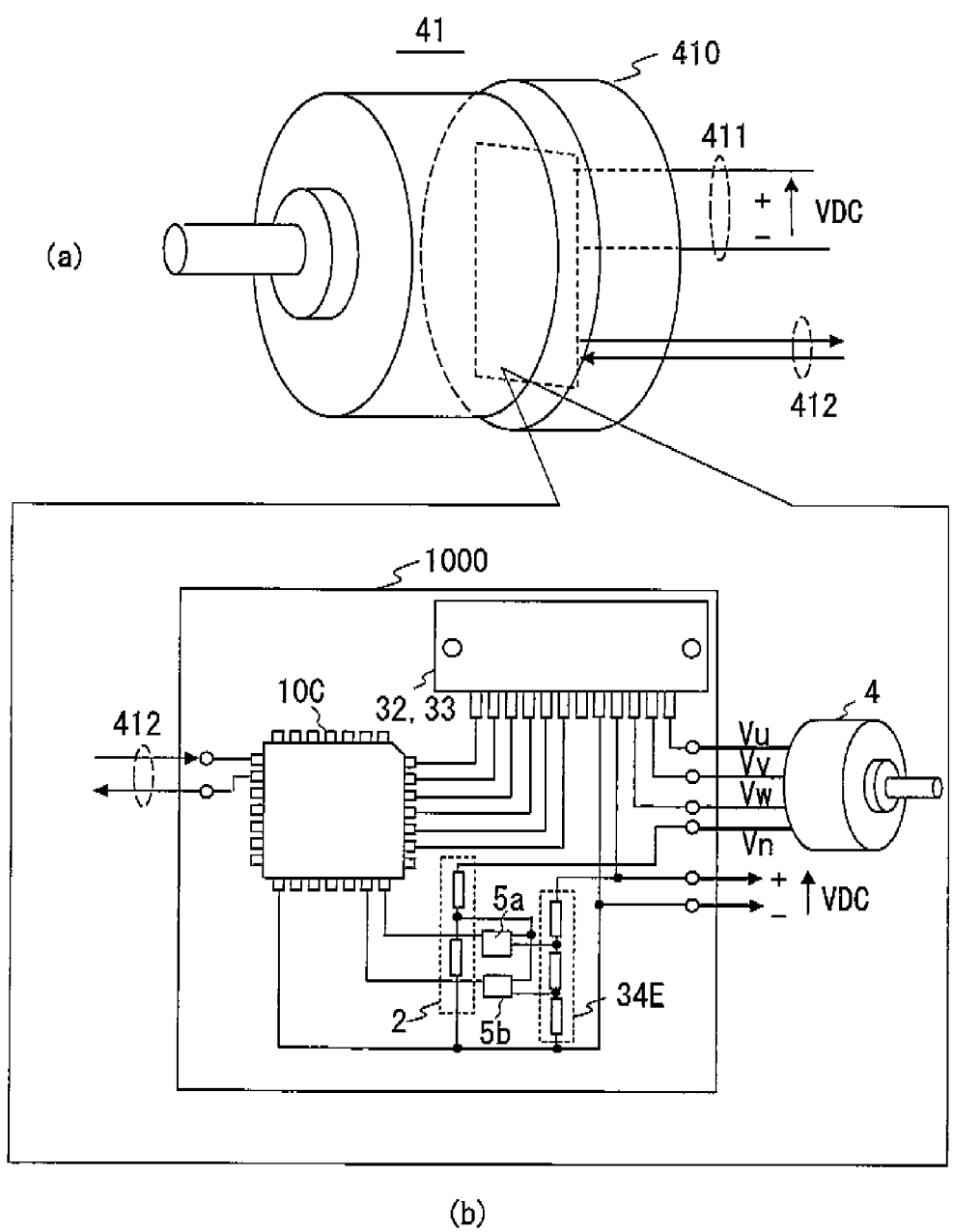
FIG. 22 is a figure showing an integrated type electric motor system 41 according to a tenth embodiment of the present invention.

FIG. 22 is a figure for explanation of a tenth embodiment, and shows the general structure of an integrated type electric motor system 41, in which the electric motor drive device 1000 according to one of the first through the eighth embodiments described above and the motor 4 are integrated together. FIG. 22(a) is an external perspective view of the integrated type electric motor system 41, while FIG. 22(b) is a figure showing the structure of the integrated type electric motor system 41. This integrated type electric motor system 41 is a device in which the motor 4 and the electric motor drive device 1000 described above are integrally provided within a casing 410. The casing 410 may also serve as a motor casing for the motor 4; or, alternatively, it would also be acceptable to provide the motor casing and the casing 410 separately.

As shown in FIG. 22(b), the digital controller 10C is implemented as a single integrated circuit, and the inverter 3 is driven by the PWM pulse waveforms outputted therefrom. The inverter 3 and the digital controller 10C are implemented upon a board, and wiring for supplying the U, V, and W phase currents and wiring for detecting the neutral point potential Vn are provided between this board and the motor 4. Due to this integration, the wiring can be housed within the casing 410. Because of this structure, the only leads that extend to the exterior from the casing 410 are the power supply line 411 to the inverter 3 and a communication line 412 that is used for the rotational speed command and for returning the operational state and so on.

Although, with the present invention, it is necessary to bring out the neutral point potential of the motor 4, the wiring for the neutral point potential becomes simple by integrating the motor and the drive circuit portion in this manner. Moreover, since it is possible to implement sensor-less determination of the position, accordingly it is possible to provide an integrated system that is extremely compact overall, and to make this system yet more compact.

Eleventh Embodiment

Figure 23:
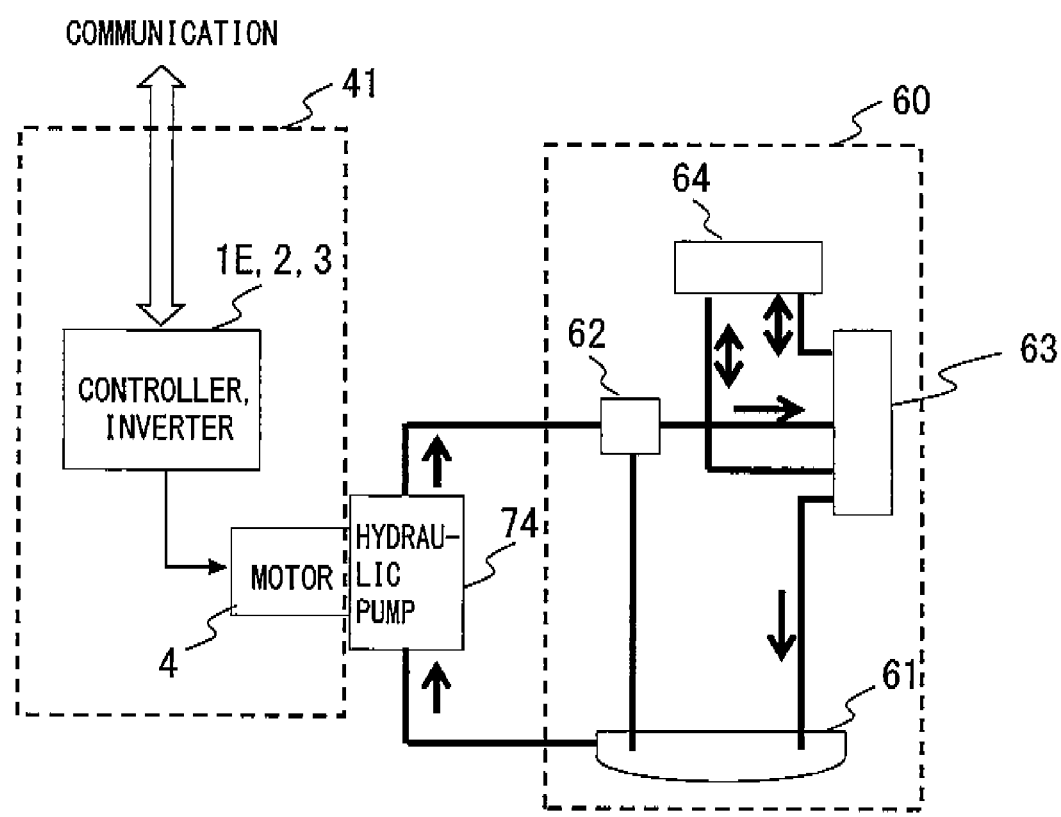
FIG. 23 is a figure showing a pump system of an eleventh embodiment.

FIG. 23 is a figure for explanation of an eleventh embodiment, and shows a pump system to which the electric motor drive device 1000 according to any of the first through the eighth embodiments described above and the motor 4 are applied. The pump system shown in FIG. 23 is a hydraulic system that includes a hydraulic pump 74, and is used in a transmission hydraulic system or a brake hydraulic system of an automobile. It should be understood that, while in FIG. 23 the pump system is constructed using the integrated type electric motor system 41 shown in the tenth embodiment, it would also be acceptable for the drive control device 1000 and the motor 4 to be provided separately.

In the hydraulic system shown in FIG. 23, the hydraulic pump 74 is attached to the motor 4. The hydraulic pressure in a hydraulic circuit 60 is controlled by the hydraulic pump 74. The hydraulic circuit 60 comprises a tank 61 that stores hydraulic oil, a relief valve 62 that keeps the hydraulic pressure less than or equal to a set value, a solenoid valve 63 that changes over the hydraulic circuit, and a cylinder 64 that functions as a hydraulic actuator.

The hydraulic pump 74 generates hydraulic pressure due to the operation of the integrated type electric motor system 41, and drives the cylinder 64, which is a hydraulic actuator. Due to the hydraulic circuit being changed over by the solenoid valve 63, the load upon the hydraulic pump 74 changes, and thereby a disturbance is imposed upon the load on the integrated type electric motor system 41. Moreover, sometimes a load is imposed upon the hydraulic circuit that is several times or more that of the pressure in the stationary state, and in some cases the motor stops, which is undesirable. For this reason, it is arranged for unduly high hydraulic pressure that would impose a high load upon the motor to be relieved by the relief valve 62.

Twelfth Embodiment

Figure 24:
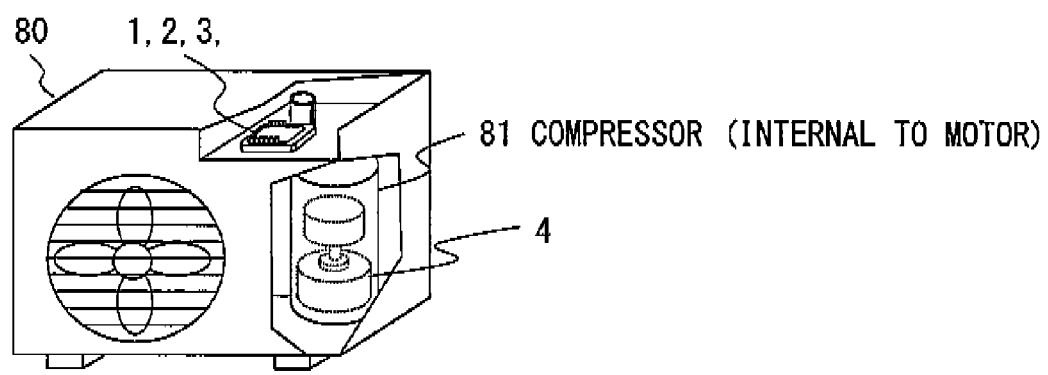
FIG. 24 is a figure showing a compressor system of a twelfth embodiment.

FIG. 24 is a figure showing a twelfth embodiment of the present invention. FIG. 24 is a figure showing an outdoor unit 80, which is a compressor system that is employed in an air conditioning system of a room air conditioner or a package air conditioner. This outdoor unit 80 of the air conditioning system comprises the above described electric motor drive device 1000 and components such as the motor 4, a compressor 81, a fan and so on. Among these, the power source for the compressor 81 is the motor 4, and this is installed in the interior of the compressor.

Thirteenth Embodiment

Figure 25:
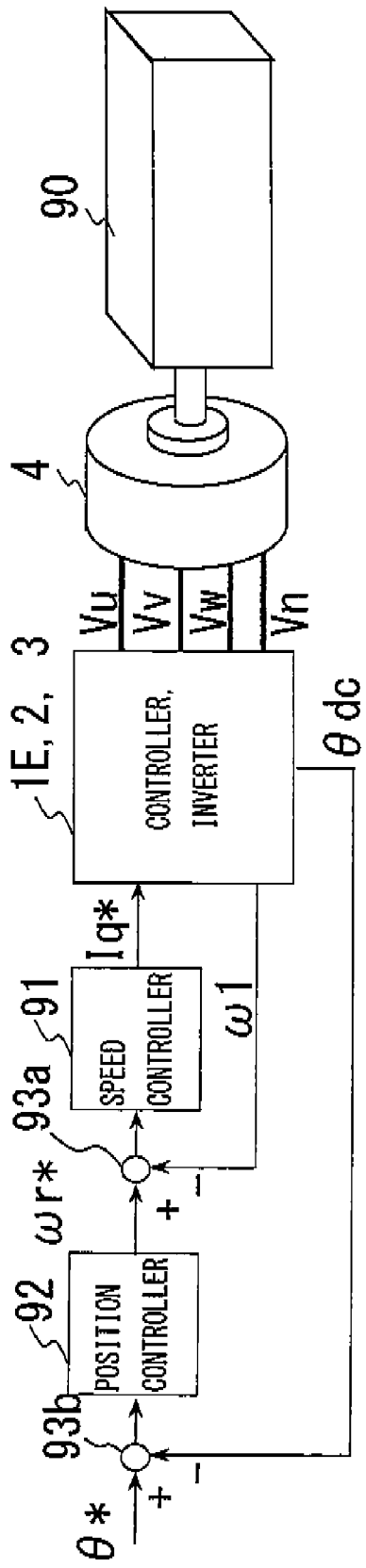
FIG. 25 is a figure showing a position determination system of a thirteenth embodiment.

FIG. 25 is a figure showing a thirteenth embodiment of the present invention. FIG. 25 is a figure showing the overall block structure of a position determination system comprising the motor 4 that drives a position determination device 90. In FIG. 25, the position determination device 90 is connected to the motor 4 as a load. A speed controller 91 is connected to the controller 1E, and functions as a higher level command generator. The actual speed ω1 is subtracted by a subtractor 93a from a speed command ωr* that is the output of a position controller 92. And the speed controller 91 calculates Iq* so as to make the value of the difference (i.e. the deviation) become zero.

The position determination device 90 is a device that employs, for example, a ball screw or the like, and is adjusted by the position controller 92 so that its position is controlled to a predetermined position θ*. No position sensor is attached to the position determination device 90, but rather the position value θdc as estimated by the controller 1 is employed just as it is. By doing this, it becomes possible to perform position control in which it is not necessary to equip the position determination device with any position sensor.

The embodiments described above may be employed either singly or in combination. This is because the advantageous effects of each of the embodiments may be obtained either by itself or in synergistic combination with other embodiments. For example, it would also be acceptable to apply the structure of FIG. 11 or FIG. 13 that employs VDC information, or a structure like that of FIG. 12 in which the power supply voltage is divided to generate two reference voltages, to a structure such as that of FIG. 7 that employs the analog switch 6. Furthermore, the structure related to offset correction shown in FIG. 16 or FIG. 19 may also be applied to the electric motor drive device 1000 shown in a figure other than FIGS. 16 and 19. It should also be understood that a structure like that of FIG. 15 that employs the insulating amplifiers may also be applied to the electric motor drive device 1000 shown in a figure other than FIG. 15. Since no high performance insulating amplifier is required in this case, in a similar manner to the case with FIG. 15, accordingly it is possible to eliminate the increase in cost and the uncertainty with regard to performance due to the use of an insulating amplifier. Furthermore, provided that the essential characteristics of the present invention are preserved, the present invention is not to be considered as being limited in any way by the embodiments described above.

The invention claimed is:

1. An electric motor drive device, comprising:
an inverter that causes a plurality of switching elements to perform ON/OFF operation, and that converts DC electrical power from a DC power supply into AC electrical power so as to drive a three-phase synchronous electric motor;
a neutral point potential detection unit that detects a neutral point potential of a stator winding of the three-phase synchronous electric motor; and
a control unit that estimates a rotor position of the three-phase synchronous electric motor based on the detected neutral point potential, and that controls the inverter based on an estimation result; wherein:
a ground potential of the control unit is set to a negative side potential or a positive side potential of a DC voltage that is supplied to the inverter;
the neutral point potential detection unit detects the neutral point potential with reference to the negative side potential or the positive side potential; and
the control unit estimates the rotor position based on a difference between a first neutral point potential detected by the neutral point potential detection unit during the ON/OFF operation and a first fixed reference potential, and based on a difference between a second neutral point potential detected by the neutral point potential detection unit during the ON/OFF operation and a second fixed reference potential.

2. An electric motor drive device according to claim 1, wherein:
the control unit comprises:
a first differential amplifier that generates a difference signal for the difference between the first neutral point potential and the first reference potential, and that amplifies and outputs this difference signal;
a second differential amplifier that generates a difference signal for the difference between the second neutral point potential and the second reference potential, and that amplifies and outputs this difference signal;
a first A/D converter that A/D converts an output signal of the first differential amplifier; and
a second A/D converter that A/D converts an output signal of the second differential amplifier; and
the rotor position is estimated based on outputs of the first and second A/D converters.

3. An electric motor drive device according to claim 1, wherein:
the control unit comprises:
a selection unit that selects one of the first reference potential and the second reference potential in conjunction with the ON/OFF operation of the plurality of switching elements;
a differential amplifier, to which the first and second neutral point potentials detected by the neutral point potential detection unit are inputted in order as a first input signal and a reference potential selected by the selection unit is inputted in order as a second input signal, and that amplifies and outputs a difference between the first input signal and the second input signal; and
an A/D converter that A/D converts an output signal of the differential amplifier; and the rotor position is estimated based on an output of the A/D converter.

4. An electric motor drive device according to claim 2, wherein:
the control unit comprises a reference potential generation unit that generates the first and second reference potentials.

5. An electric motor drive device according to claim 4, further comprising:
a DC voltage division circuit that generates a voltage-divided potential by dividing a voltage of the DC power supply; wherein
the reference potential generation unit generates the first and second reference potentials based on the voltage-divided potential.

6. An electric motor drive device according to claim 4, further comprising:
a DC voltage division circuit that generates a voltage-divided potential by dividing a voltage of the DC power supply; wherein
based on the voltage-divided potential, the control unit corrects the difference signal that has been A/D converted so as to reduce influence of power supply voltage vibration upon the difference signal, and estimates the rotor position based on the corrected difference signal.

7. An electric motor drive device according to claim 2, further comprising:
a DC voltage divider circuit that generates first and second voltage-divided potentials as the first and second reference potentials by dividing a voltage of the DC power supply.

8. An electric motor drive device according to claim 1, wherein:
an insulating amplifier is provided between the differential amplifier and the A/D converter; and
the signal outputted from the differential amplifier is inputted to the A/D converter via the insulating amplifier.

9. An electric motor drive device according to claim 1, wherein:
the control unit comprises an offset correction unit that, before starting of the three-phase synchronous electric motor, corrects an offset component included in the neutral point potential.

10. An electric motor drive device according to claim 9, wherein:
the offset correction unit sets the rotor to a plurality of rotational positions in order and detects corresponding neutral point potentials, and corrects the offset component based on a plurality of detected neutral point potentials.

11. An electric motor drive device according to claim 9, wherein:
the offset correction unit comprises a voltage command output unit that outputs a plurality of voltage commands in order, and corrects the offset component based on the neutral point potential detected by the neutral point potential detection unit when each voltage command is outputted.

12. An integrated type electric motor system, comprising, housed within a common casing, an electric motor drive device according to claim 1, and a rotor and a stator of a three-phase synchronous electric motor that is driven and controlled by the electric motor drive device.

13. A pump system, comprising:
an electric motor drive device according to claim 1;
a three-phase synchronous electric motor that is driven and controlled by the electric motor drive device; and
a pump for liquid, that is driven by the three-phase synchronous electric motor.

14. A compressor system, comprising:
an electric motor drive device according to claim 1;
a three-phase synchronous electric motor that is driven and controlled by the electric motor drive device; and
a compressor that is driven by the three-phase synchronous electric motor.

15. A position determination system, comprising:
an electric motor drive device according to claim 1;
a three-phase synchronous electric motor that is driven and controlled by the electric motor drive device; and
a position determination stage that is slidingly driven or rotationally driven by forward rotation and reverse rotation of the three-phase synchronous electric motor.

* * * * *